United States Patent
Shi et al.

(10) Patent No.: US 11,843,441 B2
(45) Date of Patent: Dec. 12, 2023

(54) MOBILITY ROBUSTNESS OPTIMIZATION (MRO) FOR NEW RADIO

(71) Applicant: Huawei Technologies Co., Ltd., Shenzhen (CN)

(72) Inventors: Xiaoli Shi, Shanghai (CN); Mingzeng Dai, Shenzhen (CN); Hongzhuo Zhang, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 17/214,034

(22) Filed: Mar. 26, 2021

(65) Prior Publication Data

US 2021/0218462 A1    Jul. 15, 2021

Related U.S. Application Data

(63) Continuation of application No. PCT/CN2019/108469, filed on Sep. 27, 2019.

(30) Foreign Application Priority Data

Sep. 28, 2018    (CN) .......................... 201811142479.7

(51) Int. Cl.
*H04B 7/08* (2006.01)
*H04W 76/19* (2018.01)
(Continued)

(52) U.S. Cl.
CPC ........... *H04B 7/088* (2013.01); *H04B 7/0626* (2013.01); *H04L 5/0051* (2013.01); *H04W 24/10* (2013.01);
(Continued)

(58) Field of Classification Search
CPC ..... H04B 7/088; H04B 7/0626; H04L 5/0051; H04W 24/10; H04W 56/001; H04W 76/19; H04W 76/27; H04W 80/02
See application file for complete search history.

(56) References Cited

U.S. PATENT DOCUMENTS

2011/0286327 A1* 11/2011 Chen ..................... H04W 76/19
370/225
2013/0165108 A1    6/2013 Xu et al.
(Continued)

FOREIGN PATENT DOCUMENTS

CN    102316501 A    1/2012
CN    102883361 A    1/2013
(Continued)

OTHER PUBLICATIONS

3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages.
(Continued)

*Primary Examiner* — Deepa Belur
(74) *Attorney, Agent, or Firm* — Slater Matsil, LLP

(57) ABSTRACT

An information transmission method includes: A terminal device sends first information to a network device, where the first information includes information indicating that a radio link failure occurs between the terminal device and a first cell, or the first information includes information indicating that beam failure recovery occurs between the terminal device and the first cell; and the first information further includes information about a resource; and the network device performs mobility robustness optimization based on the first information.

20 Claims, 17 Drawing Sheets

(51) Int. Cl.

| | | |
|---|---|---|
| *H04W 76/27* | (2018.01) | |
| *H04B 7/06* | (2006.01) | |
| *H04L 5/00* | (2006.01) | |
| *H04W 24/10* | (2009.01) | |
| *H04W 56/00* | (2009.01) | |
| *H04W 80/02* | (2009.01) | |

(52) U.S. Cl.
CPC ......... *H04W 56/001* (2013.01); *H04W 76/19* (2018.02); *H04W 76/27* (2018.02); *H04W 80/02* (2013.01)

(56) References Cited

U.S. PATENT DOCUMENTS

| | | | |
|---|---|---|---|
| 2015/0195762 A1 | 7/2015 | Watanabe et al. | |
| 2015/0208266 A1* | 7/2015 | Jung ..................... | H04L 5/0048 370/252 |
| 2017/0331577 A1 | 11/2017 | Parkvall et al. | |
| 2017/0373731 A1 | 12/2017 | Guo et al. | |
| 2018/0269950 A1 | 9/2018 | Wilson et al. | |
| 2020/0120714 A1* | 4/2020 | Wang ..................... | H04B 7/088 |
| 2020/0288526 A1* | 9/2020 | Jiang ..................... | H04W 24/08 |
| 2020/0413306 A1* | 12/2020 | Decarreau .......... | H04W 36/0058 |
| 2021/0091843 A1* | 3/2021 | Bai ..................... | H04W 36/305 |
| 2022/0353131 A1* | 11/2022 | Khoshnevisan ...... | H04L 5/0023 |

FOREIGN PATENT DOCUMENTS

| | | |
|---|---|---|
| CN | 103391567 A | 11/2013 |
| CN | 103856979 A | 6/2014 |
| CN | 104080102 A | 10/2014 |
| CN | 104115515 A | 10/2014 |
| CN | 104823474 A | 8/2015 |
| CN | 107567038 A | 1/2018 |
| CN | 107666672 A | 2/2018 |
| CN | 108476045 A | 8/2018 |
| CN | 108513737 A | 9/2018 |
| EP | 3605861 A1 | 2/2020 |
| WO | 2013134955 A1 | 9/2013 |
| WO | 2015021648 A1 | 2/2015 |
| WO | 2018115387 A1 | 6/2018 |
| WO | 2018141303 A1 | 8/2018 |
| WO | 2018148552 A1 | 8/2018 |
| WO | 2018173239 A1 | 9/2018 |
| WO | WO-2019134092 A1 * | 7/2019 .......... H04B 7/0695 |

OTHER PUBLICATIONS

3GPP TS 25.413 V15.0.0 (Jun. 2018), 3rd Generation Partnership Project; Technical Specification Group Radio Access Network; UTRAN Iu interface Radio Access Network Application Part (RANAP) signalling (Release 15), 455 pages.

NTT Docomo Inc., " Further views on mechanism to recover from beam failure", 3GPP TSG RAN WG1 Meeting #89, R1-1708452, Hangzhou, P.R. China, May 15-19, 2017, 6 pages.

Samsung Electronics, "Introduction of RLF report in SA" 3GPP TSG-RAN WG2 #103, R2-1812698, Gothenburg, Sweden, Aug. 20-24, 2018, 20 pages.

Mediatek Inc., "TP on Radio Link Monitor Related Actions in 38.331", 3GPP TSG-RAN WG2 #99-bis, R2-1710885, Prague, Czech, Oct. 9-13, 2017, 7 pages.

Mediatek, Inc., "RLF Report in NR", 3GPP TSG RAN WG2 Meeting #101bis, R2-1804612, Sanya, China, Apr. 16-20, 2018, 6 pages.

Ericsson, "Impact of 5GC on LTE features", 3GPP TSG RAN WG2 #99, Tdoc R2-1709553, Berlin, Germany, Aug. 21-25, 2017, 11 pages.

Samsung, "F1AP functions", 3GPP TSG RAN WG3 Meeting #96, R3-171637, Hangzhou, P.R. China, May 15-19, 2017, 5 pages.

Huang, Kuei-Li et al., "An enhanced MRO method for smart antenna capable (H)eNBs in LTE networks"; IEEE Asia Pacific Conference on Wireless and Mobile (APWiMob), Jan. 11, 2016, 6 pages.

Qing, Xue "Resource Control and Management Technology for Next Generation Millimeter Wave Networks", Southwest Jiaotong University, Sep. 2018, 2 pages.

Mediatek Inc., "[M156] Need of RLF Report in NR", 3GPP TSG-RAN WG2 Meeting #103, R2-1811117, Gothenburg, Sweden, Aug. 20-24, 2018, 3 pages.

* cited by examiner

MOBILITY ROBUSTNESS OPTIMIZATION (MRO) FOR NEW RADIO

CROSS-REFERENCE TO RELATED APPLICATIONS

This application is a continuation of International Application No. PCT/CN2019/108469, filed on Sep. 27, 2019, which claims priority to Chinese Patent Application No. 201811142479.7, filed on Sep. 28, 2018. The disclosures of the aforementioned applications are herein incorporated by reference in their entireties.

TECHNICAL FIELD

This application relates to the communications field, and more specifically, to an information transmission method and apparatus.

BACKGROUND

Inappropriate handover (HO) parameter settings adversely affect user experience. In addition, network resources are wasted due to a ping-pong handover, a handover failure, and a radio link failure. A radio link failure caused by an inappropriate handover parameter affects user experience and the network resources.

In a long term evolution (LTE) system, a large amount of time is spent in manually setting a system handover parameter, and great costs are taken to update a mobility parameter after initial network deployment. In addition, in some cases, through radio resource management (RRM) in a network device, a problem can be detected, and the mobility parameter can be adjusted. However, in some cases, a problem cannot be resolved through the RRM. Therefore, mobility robustness optimization (MRO) is proposed.

In the LTE system, MRO optimization is mainly used to optimize the mobility parameter, such as an offset of an A3 handover event. Specifically, the network device determines, based on a radio link failure (RLF) report reported by a terminal device, a radio link failure indication (RLF indication) exchanged through an interface, and a handover report (HO report), whether the mobility parameter needs to be optimized.

Currently, in a new radio (NR) system, there is no good mechanism for accurately performing MRO in a timely manner.

SUMMARY

In view of this, this application provides an information transmission method, to help a network device accurately perform MRO in a timely manner.

According to a first aspect, an information transmission method is provided. The method includes: A first network device receives first information from a terminal device, where the first information includes information indicating that a radio link failure occurs between the terminal device and a first cell, or the first information includes information indicating that beam failure recovery occurs between the terminal device and the first cell; and the first information further includes information about a resource, and the information about the resource includes at least one of information about a beam, information about an uplink carrier, or information about a bandwidth part. The first network device performs mobility robustness optimization based on the first information.

In some possible implementations, the information about the resource includes any one or more of the following: an identifier of the beam, an identifier of the uplink carrier, or an identifier of the bandwidth part.

A beam, an uplink carrier (a normal uplink carrier/a supplementary uplink carrier), and a bandwidth part (BWP) are introduced into an NR system. When the terminal device selects different beams, uplink carriers, or bandwidth parts, a radio link failure (RLF) or a beam failure (BF) may be caused.

In some possible implementations, the first information includes the information indicating that the radio link failure occurs between the terminal device and the first cell, and the first information is an RLF report.

In some possible implementations, the first information includes the information indicating that the beam failure recovery occurs between the terminal device and the first cell, and the first information is a BFR report.

In some possible implementations, the beam includes a synchronization signal block SSB and/or a channel state information reference signal CSI-RS.

In some possible implementations, the uplink carrier includes a normal uplink carrier and a supplementary uplink carrier.

According to the information transmission method in this embodiment of this application, when the RLF or the BF occurs, the terminal device may report the radio link failure report (RLF report) or the beam failure recovery report (BFR report) to the network device. The RLF report or the BFR report carries one or more of the information about the beam, the information about the uplink carrier, or the information about the bandwidth part. This helps the network device accurately perform MRO in a timely manner.

With reference to the first aspect, in some possible implementations of the first aspect, when the first information includes the information indicating that the beam failure recovery occurs between the terminal device and the first cell, the first information further includes at least one of a quantity of beam failures, a quantity of beam failure recovery times, or duration of the beam failure recovery.

With reference to the first aspect, in some possible implementations of the first aspect, the first cell is a cell served by the first network device. When the first information includes the information indicating that the beam failure recovery occurs between the terminal device and the first cell, that the first network device performs mobility robustness optimization based on the first information includes: The first network device adjusts a configuration of the resource, or the first network device sends second information to a second network device, where the second information is used to indicate the second network device to adjust a mobility parameter.

For example, the first network device may be a target network device, the second network device may be a source network device, the first cell is a cell served by the target network device, and the terminal device is successfully handed over from the second network device to the first network device. In a period of time, after the BF occurs in the first cell served by the first network device but the BFR succeeds, the terminal device sends the first information to the first network device, and the first network device determines a cause of the BF. If the cause is a resource configuration problem, the first network device adjusts the configuration of the resource. If the cause is a downlink mobility parameter problem, the first network device may indicate the second network device to adjust a downlink mobility parameter.

In some possible implementations, the information, about the resource, reported by the terminal device includes the information (for example, identification information) about the beam (the SSB and/or the CSI-RS). The first network device determines that the BF is caused by an improper threshold configuration of the beam, and that the first network device adjusts a configuration of the resource includes: The first network device adjusts a first threshold corresponding to the SSB; and/or the first network device adjusts a second threshold corresponding to the CSI-RS.

In some possible implementations, the information, about the resource, of the terminal device includes the information (for example, identification information) about the beam and the information about the uplink carrier (for example, an identifier of the uplink carrier). The first network device determines that the BF is caused by improper configurations of a threshold of the beam and a threshold of the uplink carrier, and that the first network device adjusts a configuration of the resource includes: The first network device adjusts a first threshold corresponding to the SSB; and/or the first network device adjusts a second threshold corresponding to the CSI-RS; and/or the first network device adjusts a third threshold corresponding to the supplementary uplink carrier.

In some possible implementations, the first network device may further adjust a random access channel RACH resource.

With reference to the first aspect, in some possible implementations of the first aspect, the first cell is a cell served by the first network device. When the first information includes the information indicating that the radio link failure occurs between the terminal device and the first cell, that a first network device receives first information from a terminal device includes: The first network device receives the first information sent by a second network device. That the first network device performs mobility robustness optimization based on the first information includes: The first network device adjusts a configuration of the resource, or the first network device sends second information to the second network device, where the second information is used to indicate the second network device to adjust a mobility parameter.

For example, the first network device may be a target network device, the second network device may be a source network device, the first cell is a cell served by the target network device, and the RLF occurs when the terminal device is handed over from the second network device to the first network device, or the RLF occurs after the terminal device is successfully handed over to the first network device. After being reconnected to the second network device, the terminal device sends the first information to the second network device, the second network device forwards the first information to the first network device, and the first network device determines a cause of the RLF. If the cause is a resource configuration problem, the first network device adjusts the configuration of the resource. If the cause is a downlink mobility parameter problem, the first network device may indicate the second network device to adjust a downlink mobility parameter.

In some possible implementations, the information, about the resource, reported by the terminal device includes the information (for example, identification information) about the beam (the SSB and/or the CSI-RS). The first network device determines that the RLF is caused by an improper threshold configuration of the beam, and that the first network device adjusts a configuration of the resource includes: The first network device adjusts a first threshold corresponding to the SSB; and/or the first network device adjusts a second threshold corresponding to the CSI-RS.

In some possible implementations, the information, about the resource, of the terminal device includes the information (for example, identification information) about the beam and the information about the uplink carrier (for example, an identifier of the uplink carrier). The first network device determines that the RLF is caused by improper configurations of a threshold of the beam and a threshold of the uplink carrier, and that the first network device adjusts a configuration of the resource includes: The first network device adjusts a first threshold corresponding to the SSB; and/or the first network device adjusts a second threshold corresponding to the CSI-RS; and/or the first network device adjusts a third threshold corresponding to the supplementary uplink carrier.

In some possible implementations, the first network device may further adjust a random access channel RACH resource.

With reference to the first aspect, in some possible implementations of the first aspect, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

With reference to the first aspect, in some possible implementations of the first aspect, that the first network device adjusts a configuration of the resource includes any one or more of the following: The first network device adjusts a first threshold corresponding to the SSB; the first network device adjusts a second threshold corresponding to the CSI-RS; the first network device adjusts a third threshold corresponding to the supplementary uplink carrier; or the first network device adjusts a random access channel RACH resource.

With reference to the first aspect, in some possible implementations of the first aspect, a protocol layer function of the first network device is at least one of a radio link control protocol layer function, a media access control layer function, and a physical layer function; and/or a protocol layer function of the second network device is at least one of a radio resource control protocol layer function, a service data adaptation layer function, and a packet data convergence protocol layer function.

With reference to the first aspect, in some possible implementations of the first aspect, the first cell is a cell served by a second network device. When the first information includes the information indicating that the beam failure recovery occurs between the terminal device and the first cell, that a first network device receives first information from a terminal device includes: The first network device receives the first information sent by the second network device. That the first network device performs mobility robustness optimization based on the first information includes: The first network device adjusts a mobility parameter, or the first network device sends third information to the second network device, where the third information is used to indicate the second network device to adjust a configuration of the resource.

For example, the first network device may be a source network device, the second network device may be a target network device, the first cell is a cell served by the target network device, and the terminal device is successfully handed over from the first network device to the second network device. In a period of time, after the BF occurs in the first cell served by the second network device but the BFR succeeds, the terminal device sends the first information to the second network device, the second network device forwards the first information to the first network device, and the first network device determines a cause of the BF. If the cause is a resource configuration problem, the first network device indicates the second network device to adjust the configuration of the resource. If the cause is a downlink mobility parameter problem, the first network device adjusts a downlink mobility parameter.

In some possible implementations, that the first network device adjusts a mobility parameter includes: The first network device adjusts a related parameter of an A3 event.

With reference to the first aspect, in some possible implementations of the first aspect, the first cell is a cell served by a second network device. When the first information includes the information indicating that the radio link failure occurs between the terminal device and the first cell, that the first network device performs mobility robustness optimization based on the first information includes: The first network device adjusts a mobility parameter, or the first network device sends third information to the second network device, where the third information is used to indicate the second network device to adjust a configuration of the resource.

For example, the first network device may be a source network device, the second network device may be a target network device, the first cell is a cell served by the target network device, and the RLF occurs when the terminal device is handed over from the first network device to the second network device, or the RLF occurs in a period of time after the terminal device is successfully handed over from the first network device to the second network device. After being reconnected to the first network device, the terminal device sends the first information to the first network device, and the first network device determines a cause of the RLF. If the cause is a resource configuration problem, the first network device indicates the second network device to adjust the configuration of the resource. If the cause is a downlink mobility parameter problem, the first network device adjusts a downlink mobility parameter.

In some possible implementations, that the first network device adjusts a mobility parameter includes: The first network device adjusts a related parameter of an A3 event.

With reference to the first aspect, in some possible implementations of the first aspect, the method further includes: The first network device receives fourth indication information sent by the second network device, where the fourth indication information is used to indicate an adjusted configuration of the resource.

With reference to the first aspect, in some possible implementations of the first aspect, a protocol layer function of the first network device is at least one of a radio resource control protocol layer function, a service data adaptation layer function, and a packet data convergence protocol layer function; and/or a protocol layer function of the second network device is at least one of a radio link control protocol layer function, a media access control layer function, and a physical layer function.

According to a second aspect, an information transmission method is provided. The method includes: A first network device receives first information sent by a terminal device, where the first information includes information indicating that beam failure recovery occurs between the terminal device and a first cell.

In some possible implementations, the first information is a BFR report.

According to a third aspect, an information transmission method is provided. The method includes: A first network device sends first information to a second network device, where the first information includes information indicating that beam failure recovery occurs between a terminal device and a first cell.

In some possible implementations, the first information is a BFR report.

According to a fourth aspect, an information transmission method is provided. The method includes: A first network device sends indication information to a second network device, where the indication information is used to indicate the second network device to adjust a configuration of a resource.

In some possible implementations, the resource includes one or more of a beam, an uplink carrier, a BWP, or a RACH resource.

According to a fifth aspect, an information transmission method is provided. The method includes: A second network device receives indication information sent by a first network device, where the indication information is used to indicate the second network device to adjust a configuration of a resource.

The second network device adjusts the configuration of the resource.

In some possible implementations, the resource includes one or more of a beam, an uplink carrier, a BWP, or a RACH resource.

In some possible implementations, that the second network device adjusts the configuration of the resource includes any one or more of the following: The second network device adjusts a first threshold corresponding to an SSB; the second network device adjusts a second threshold corresponding to a CSI-RS; the second network device adjusts a third threshold corresponding to a supplementary uplink carrier; or the second network device adjusts a random access channel RACH resource.

According to a sixth aspect, an information transmission method is provided. The method includes: A terminal device sends first information, where the first information includes information indicating that a radio link failure occurs between the terminal device and a first cell, or the first information includes information indicating that beam failure recovery occurs between the terminal device and the first cell; and the first information further includes information about a resource, and the information about the resource includes at least one of information about a beam, information about an uplink carrier, or information about a bandwidth part.

With reference to the sixth aspect, in some possible implementations of the sixth aspect, when the first information includes the information indicating that the beam failure recovery occurs between the terminal device and the first cell, the first information further includes at least one of a quantity of beam failures, a quantity of beam failure recovery times, or duration of the beam failure recovery.

In some possible implementations, before that a terminal device sends first information, the method further includes: The terminal device determines that the quantity of beam failures is greater than or equal to a first value; and/or the terminal device determines that the quantity of beam failure recovery times is greater than or equal to a second value; and/or the terminal device determines that a timer expires.

In some possible implementations, the first value and the second value are configured by a network device.

With reference to the sixth aspect, in some possible implementations of the sixth aspect, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

According to the information transmission method in this embodiment of this application, when the RLF or the BF occurs, the terminal device may report a radio link failure report (RLF report) or a beam failure recovery report (BFR report) to the network device. The RLF report or the BFR report carries one or more of the information about the beam, the information about the uplink carrier, or the information about the bandwidth part. This helps the network device accurately perform MRO in a timely manner.

According to a seventh aspect, an information transmission apparatus is provided, and is configured to perform the method in any one of the first aspect to the fifth aspect or the possible implementations of the first aspect to the fifth aspect. For example, the information transmission apparatus may include units configured to perform the method in any one of the first aspect to the fifth aspect or the possible implementations of the first aspect to the fifth aspect.

According to an eighth aspect, an information transmission apparatus is provided, and is configured to perform the method in any one of the sixth aspect or the possible implementations of the sixth aspect. For example, the information transmission apparatus may include units configured to perform the method in any one of the sixth aspect or the possible implementations of the sixth aspect.

According to a ninth aspect, an information transmission apparatus is provided. The apparatus may be the network device (the first network device or the second network device) in the foregoing method designs or a chip disposed in the network device. The apparatus includes a processor. The processor is coupled to a memory, and may be configured to execute an instruction in the memory, to implement the method in any one of the first aspect to the fifth aspect or the possible implementations of the first aspect to the fifth aspect. Optionally, the apparatus further includes the memory. Optionally, the apparatus further includes a communications interface, and the processor is coupled to the communications interface.

When the apparatus is the first network device, the communications interface may be a transceiver or an input/output interface.

When the apparatus is a chip disposed in the first network device, the communications interface may be an input/output interface.

Optionally, the transceiver may be a transceiver circuit. Optionally, the input/output interface may be an input/output circuit.

According to a tenth aspect, an information transmission apparatus is provided. The apparatus may be the terminal device in the foregoing method designs, or may be a chip disposed in the terminal device. The apparatus includes a processor. The processor is coupled to a memory, and may be configured to execute an instruction in the memory, to implement the method performed by the terminal device in any one of the sixth aspect or the possible implementations of the sixth aspect. Optionally, the apparatus further includes the memory. Optionally, the apparatus further includes a communications interface, and the processor is coupled to the communications interface.

When the apparatus is the terminal device, the communications interface may be a transceiver or an input/output interface.

When the apparatus is a chip disposed in the terminal device, the communications interface may be an input/output interface.

Optionally, the transceiver may be a transceiver circuit. Optionally, the input/output interface may be an input/output circuit.

According to an eleventh aspect, a program is provided. When being executed by a processor, the program is used to perform the method according to the first aspect to the sixth aspect.

According to a twelfth aspect, a program product is provided. The program product includes program code. When the program code is run by a communications unit, a processing unit, a transceiver, or a processor of an apparatus (for example, a network device or a terminal device), the apparatus is enabled to perform the method in any one of the first aspect to the sixth aspect and the possible implementations of the first aspect to the sixth aspect.

According to a thirteenth aspect, a computer-readable medium is provided. The computer-readable medium stores a program, and the program enables an apparatus (for example, a network device or a terminal device) to perform the method in any one of the first aspect to the sixth aspect and the possible implementations of the first aspect to the sixth aspect.

DETAILED DESCRIPTION OF ILLUSTRATIVE EMBODIMENTS

Figure 1:
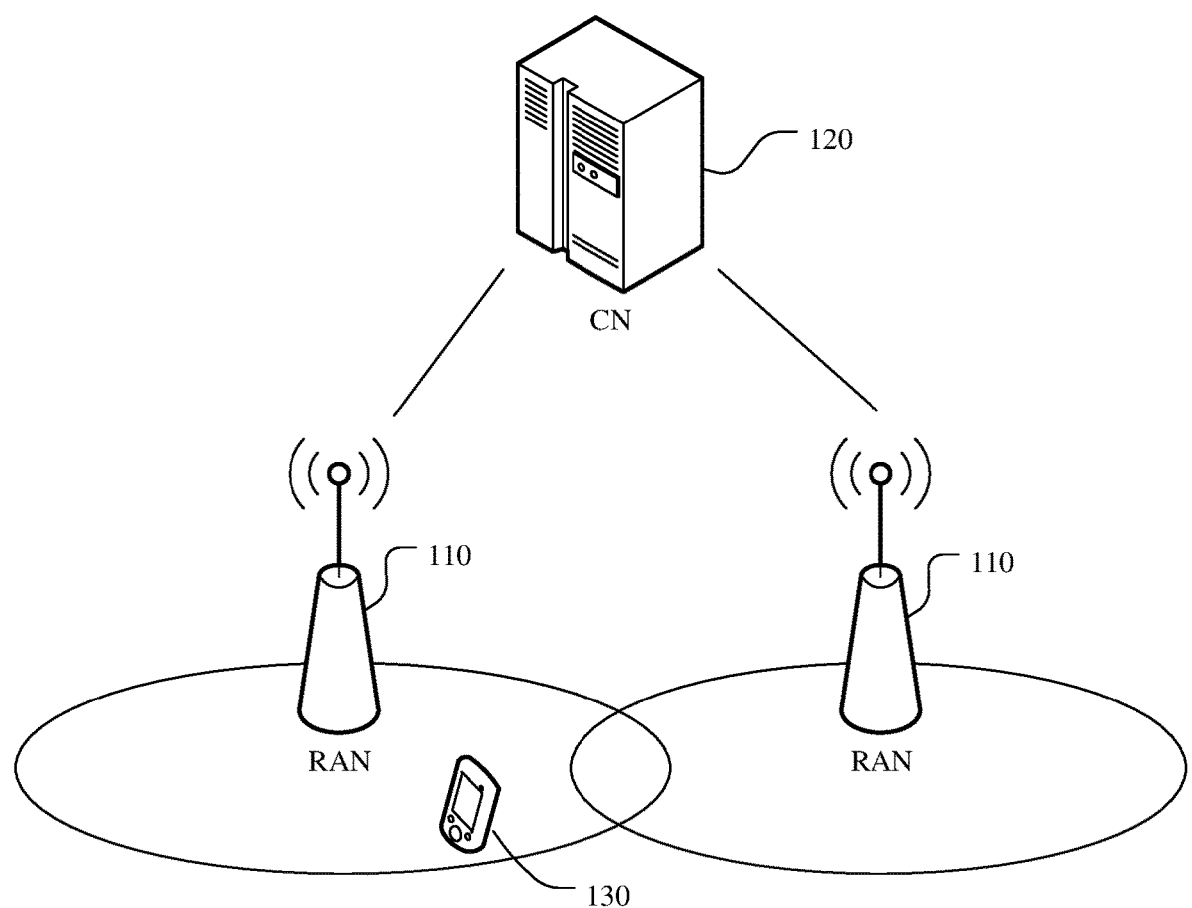
FIG. 1 is a schematic diagram of a communications system according to an embodiment of this application.

The following describes technical solutions of this application with reference to accompanying drawings.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or a new radio (NR) system.

A terminal device in the embodiments of this application may also be referred to as user equipment, an access terminal device, a subscriber unit, a subscriber station, a mobile station, a remote station, a remote terminal device, a mobile device, a user terminal device, a terminal device, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, or may be a NodeB (NB) in the wideband code division multiple access (WCDMA) system, or may be an evolved NodeB (evolved NodeB, eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant communications software. In addition, a specific structure of an entity for executing a method provided in the embodiments of this application is not specifically limited in the embodiments of this application, provided that a program that records code for the method provided in the embodiments of this application can be run to perform communication according to the method provided in the embodiments of this application. For example, the entity for executing the method provided in the embodiments of this application may be the terminal device, the network device, or a functional module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) and a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a communications system 100 according to an embodiment of this application. As shown in FIG. 1, a terminal device 130 accesses a wireless network, to obtain a service of an external network (for example, the internet) by using the wireless network, or communicate with another terminal device by using the wireless network. The wireless network includes a RAN 110 and a core network (CN) 120. The RAN 110 is configured to connect the terminal device 130 to the wireless network, and the CN 120 is configured to manage the terminal device and provide a gateway for communicating with the external network.

It should be understood that the communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 130 shown in FIG. 1, for example, may be the terminal device 130 in FIG. 1, or may be a chip configured in the terminal device 130. The other communications apparatus in the two communications apparatuses may correspond to the RAN no shown in FIG. 1, for example, may be the RAN 110 in FIG. 1, or may be a chip configured in the RAN 110.

Without loss of generality, the following describes the embodiments of this application in detail by using an interaction process between a terminal device and a network device as an example. It may be understood that any terminal device in the wireless communications system may communicate, via a same method, with one or more network devices having a wireless communication connection with the terminal device. This is not limited in this application.

Figure 2:
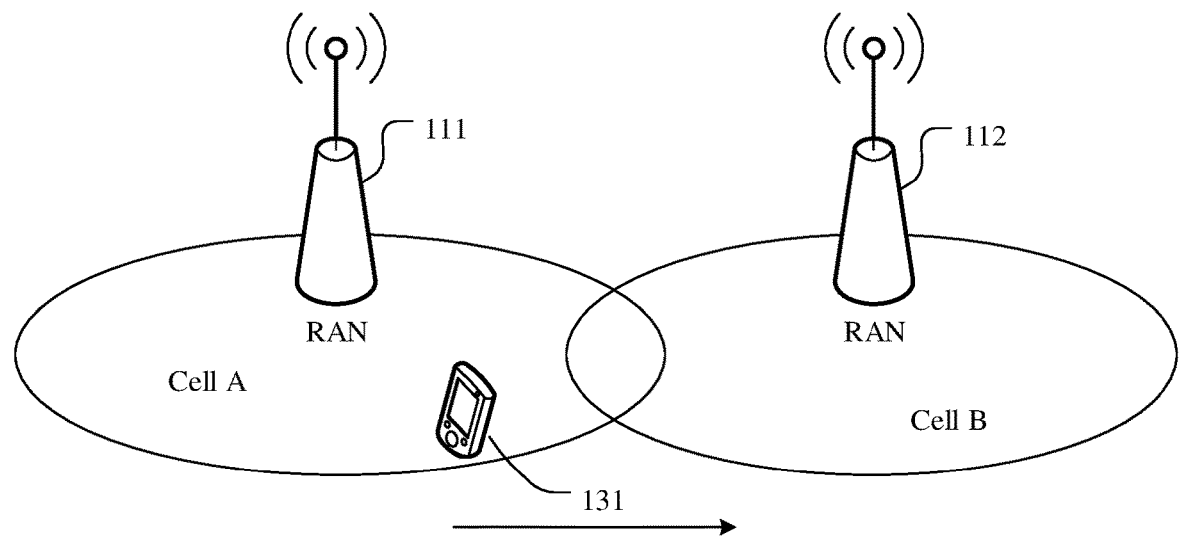
FIG. 2 is a schematic diagram of an application scenario of a technical solution according to an embodiment of this application.

FIG. 2 is a schematic diagram of an application scenario of a technical solution according to an embodiment of this application. As shown in FIG. 2, for example, a terminal device 131 is in a cell A served by a RAN 111. At a moment, the terminal device 131 receives a handover command (HO command) from the RAN 111, and the command indicates the terminal device 131 to be handed over to a cell B served by a RAN 112. An RLF occurs before the handover is completed. The terminal device 131 performs cell selection and selects the cell A, and attempts to perform radio resource control (RRC) reestablishment. The terminal device 131 reestablishes a connection to the cell A, and after the reestablishment succeeds, the RAN 111 can identify this handover scenario as a too early handover scenario.

For another example, as shown in FIG. 2, a terminal device 131 is in a cell A served by a RAN 111. At a moment, the terminal device 131 receives an HO command from the RAN 111, and the command indicates the terminal device 131 to be handed over to a cell B served by a RAN 112. The terminal device 131 is successfully handed over to the cell B served by the RAN 112, and the RAN 112 sends context release information to the RAN 111 and starts a timer. An RLF occurs within a period of time after the handover is completed. The terminal device 131 performs cell reselection and selects the source cell A, and then attempts to establish an RRC connection. After the RRC reestablishment is completed, the RAN 111 sends an RLF indication to the RAN 112. If the timer is still running when the RAN 112 receives the RLF indication, the RAN 112 sends a handover report (HO report) to the RAN 111, so as to indicate the RAN 111 that the handover is a premature handover.

For still another example, a terminal device 131 is in a cell A served by a RAN 111. At a moment, the terminal device 131 receives an HO command from the RAN 111, and the command indicates the terminal device 131 to be handed over to a cell B served by a RAN 112. An RLF occurs before the handover is completed. The terminal device 131 performs cell selection and selects the cell B, and performs RRC reestablishment. After an RRC is reestablished to the cell B, the RAN 112 sends an RLF indication to the RAN 111, where the RLF indication includes information such as an RLF report, and the RAN 111 can identify this handover scenario as a too late handover scenario.

For still another example, a terminal device 131 is in a cell A served by a RAN 111. At a moment, the terminal device 131 receives an HO command from the RAN 111, and the command indicates the terminal device 131 to be handed over to a cell B served by a RAN 112. The terminal device 131 is successfully handed over to the cell B served by the RAN 112. Within a period of time after the handover is completed, a beam failure (BF) or beam failure recovery (BFR) occurs on the terminal device in the cell B. In this case, because an RRC connection between the terminal device 131 and the cell B still exists, the terminal device 131 may report a beam failure recovery report (BFR report) to the RAN 112, and the RAN 112 may determine a cause of the beam failure. If it is determined that the beam failure is caused by a premature handover, the RAN 112 sends a handover report (HO report) to the RAN 111, to indicate the RAN in that the handover is a premature handover. Alternatively, if it is determined that the beam failure is not caused by a premature handover, this handover scenario may be defined as another scenario, and a specific name of the another scenario is not limited in this embodiment of this application.

Figure 3:
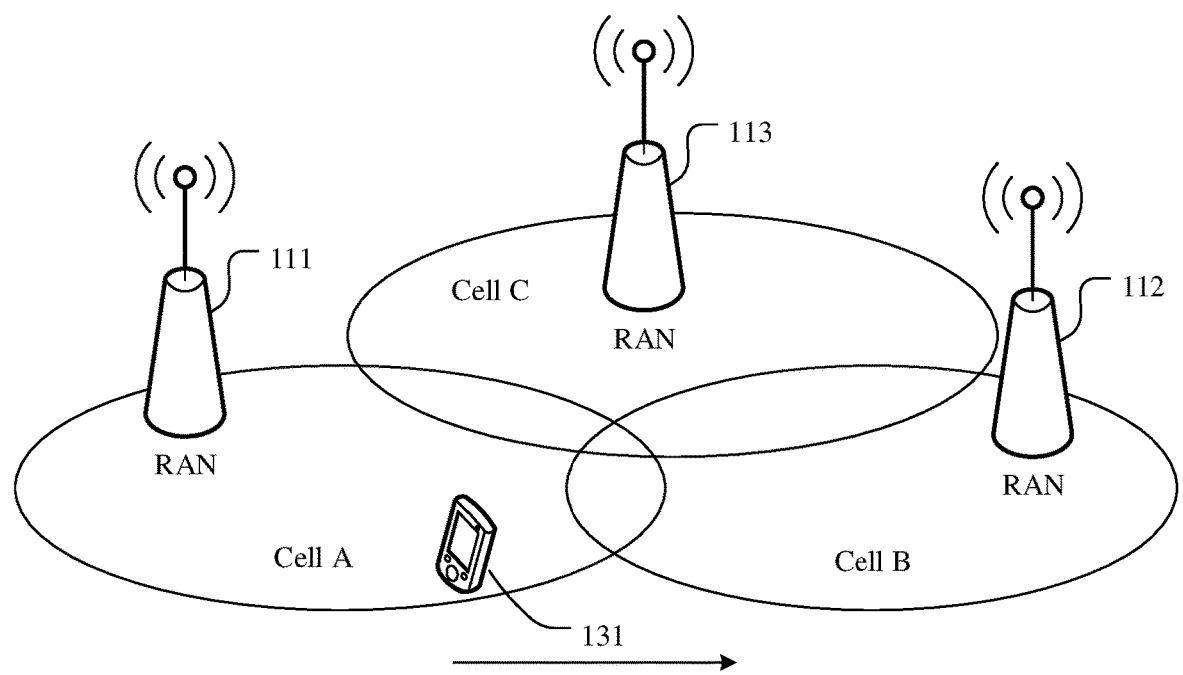
FIG. 3 is another schematic diagram of an application scenario of a technical solution according to an embodiment of this application.

FIG. 3 is another schematic diagram of an application scenario of a technical solution according to an embodiment of this application. As shown in FIG. 3, for example, at a moment, a terminal device 131 receives an HO command from a RAN 111, and the command indicates the terminal device 131 to be handed over to a cell B served by a RAN 112. An RLF occurs before the handover is completed, and the terminal device 131 performs cell selection and selects a cell C served by a RAN 113, and performs RRC reestablishment. After an RRC is reestablished to the cell C, the RAN 113 identifies the source cell A, and then sends an RLF indication to the RAN 111. The RAN 111 may identify this handover scenario as a scenario of a handover to an incorrect cell.

For another example, a terminal device 131 is in a cell A served by a RAN 111. At a moment, the terminal device 131 receives an HO command from the RAN 111, and the command indicates the terminal device 131 to be handed over to a cell B served by a RAN 112. The terminal device 131 is successfully handed over to the cell B served by the RAN 112, and the RAN 112 sends context release information to the RAN 111 and starts a timer timer. An RLF occurs within a period of time after the handover is completed. The terminal device 131 performs cell reselection and selects a cell C served by a RAN 113, and performs RRC reestablishment. After the RRC reestablishment is completed, the RAN 111 sends an RLF indication to the RAN 112. If the timer is still running when the RAN 112 receives the RLF indication, the RAN 112 sends an HO report to the RAN 111, so as to indicate the RAN 111 that the terminal device is handed over to an incorrect cell.

Figure 4:
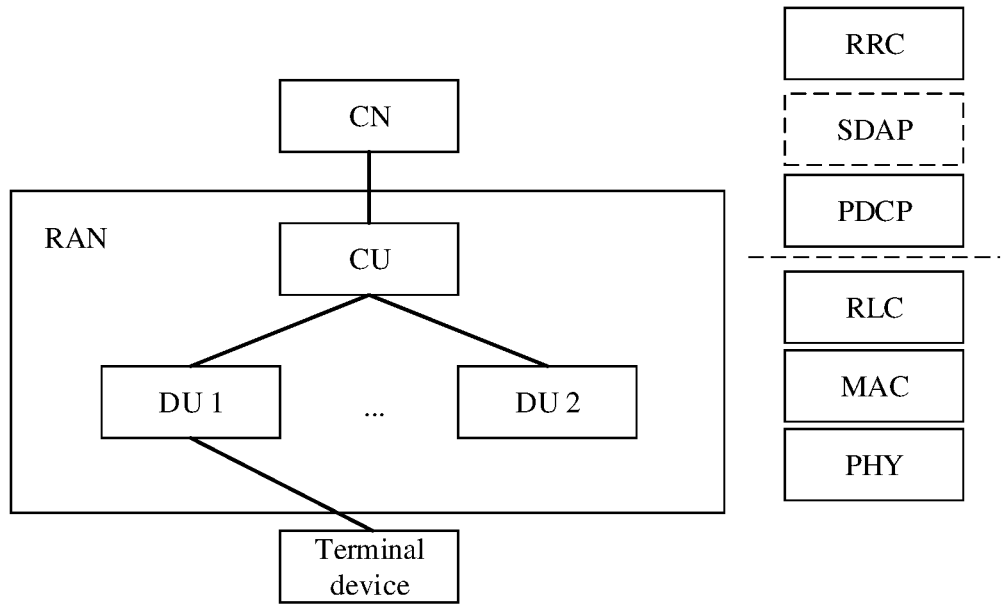
FIG. 4 is a schematic diagram of a network architecture according to an embodiment of this application.

FIG. 4 is a schematic diagram of a network architecture according to an embodiment of this application. As shown in FIG. 4, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts are integrated into the baseband apparatus. For example, in an LTE communications system, a RAN device (eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN device and a terminal device complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU). A plurality of DUs (for example, a DU 1 and a DU 2) may be centrally controlled by one CU. As shown in FIG. 2, the CU and the DU may be divided based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU.

The RAN device may implement the functions of the protocol layers such as the RRC layer, the PDCP layer, the RLC layer, and the MAC layer by using one node. Alternatively, the RAN device may implement the functions of these protocol layers by using a plurality of nodes. For example, in an evolved structure, a RAN device may include a CU and a DU, and a plurality of DUs may be centrally controlled by one CU. As shown in FIG. 4, the CU and the DU may be divided based on a protocol layer of a wireless network. For example, functions of the PDCP layer and a protocol layer above the PDCP layer are set on the CU. For example, the CU has the functions of the PDCP layer and the RRC protocol layer. Functions of protocol layers below the PDCP layer, such as the RLC layer, the MAC layer, and the physical layer, may be set on the DU.

Division based on the protocol layer is merely an example, and division may alternatively be performed based on another protocol layer, for example, the RLC layer. Functions of the RLC layer and protocol layers above the RLC layer are set on the CU, and functions of protocol layers below the RLC layer are set on the DU. Alternatively, division is performed at a protocol layer, for example, a portion of functions of the RLC layer and functions of protocol layers above the RLC layer are set on the CU, and remaining functions of the RLC layer and functions of protocol layers below the RLC layer are set on the DU. In addition, division may alternatively be performed in another manner, for example, the division is performed based on a latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or a part of the radio frequency apparatus is remotely implemented and a remaining part of the radio frequency apparatus is integrated into the DU. This is not limited herein.

Figure 5:
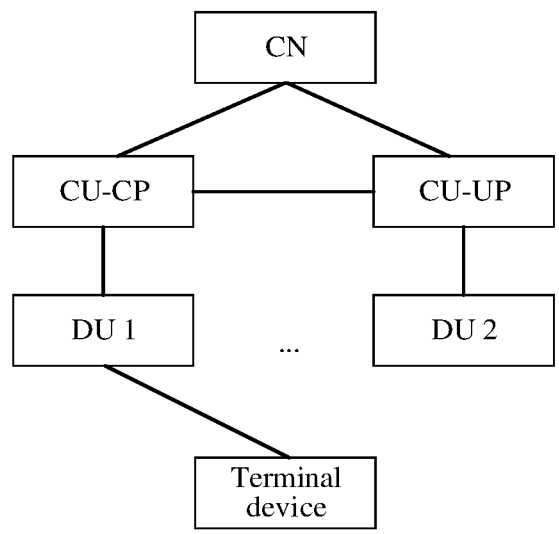
FIG. 5 is another schematic diagram of a network architecture according to an embodiment of this application.

Refer to FIG. 5. FIG. 5 is a schematic diagram of another network architecture according to an embodiment of this application. Different from the architecture shown in FIG. 4, a control plane (CP) and a user plane (UP) of a CU may be further separately implemented as different entities, and the different entities are a control plane CU entity (CU-CP entity) and a user plane CU entity (CU-UP entity).

In the foregoing network architectures, signaling generated by the CU may be sent to a terminal device by using a DU (for example, a DU 1 or a DU 2), or signaling generated by a terminal device may be sent to the CU by using a DU. The DU does not parse the signaling, but directly encapsulates the signaling at a protocol layer, and transparently transmits the signaling to the terminal device or the CU. In the following embodiments, if transmission of such signaling between the DU and the terminal device is involved, sending or receiving the signaling by the DU includes this scenario. For example, signaling at an RRC layer or a PDCP layer is finally processed as signaling at a PHY layer and sent to the terminal device, or is converted from received signaling at a PHY layer. In this architecture, the signaling at the RRC layer or the PDCP layer may also be considered to be sent by the DU, or sent by the DU and a radio frequency apparatus.

In the foregoing embodiments, the CU is classified as a network device on a RAN side. In addition, the CU may alternatively be classified as a network device on a CN side. This is not limited herein.

An apparatus in the following embodiments of this application may be located in the terminal device based on functions implemented by the apparatus. When the foregoing CU-DU structure is used, the network device may be a CU node, a DU node, or a RAN device including a CU node and a DU node.

In an NR system, a concept of beam is introduced, so that a random access process in a mobility handover process relates to how to select a beam. Currently, a beam may include a synchronization signal block (SSB) and/or a channel state information reference signal (CSI-RS), and the CSI-RS may be used for random access in a non-contention scenario. The beam may be configured by using RRC, the SSB is sent to the terminal device by using a broadcast message, and the CSI-RS may be configured for the terminal device by using RRC dedicated signaling. For example, in a handover process, after receiving a handover request message sent by a source base station, a target base station returns a handover request response. The handover request response includes a beam configuration sent to the terminal device. Two thresholds (rsrp-ThresholdSSB and csirs-Threshold) are respectively configured for the SSB and the CSI-RS. The thresholds are used by the terminal device to select a beam. The network device may configure SSB-based or CSI-RS-based measurement information for the terminal device, and the terminal device measures a reference signal received power (RSRP) of the SSB or an RSRP of the CSI-RS. For example, when an RSRP obtained by the terminal device by measuring the SSB exceeds an RSRP threshold of the SSB, a preamble associated with the corresponding SSB is selected to perform random access.

In addition, a supplementary uplink (SUL) carrier is further introduced to the NR system, that is, one cell supports one downlink carrier and two uplink carriers. In this case, a corresponding SUL threshold (sul-RSRP-Threshold) is also introduced. To be specific, when the terminal device initially performs random access, the terminal device determines, by comparing measured signal strength with the SUL threshold, whether to select a normal uplink (normal uplink, UL) carrier or the SUL carrier. When the terminal device is in a handover scenario, whether the terminal device uses the UL or the SUL or both the UL and the SUL may be indicated by using RRC dedicated signaling.

In an LTE system, MRO optimization is mainly used to optimize a mobility parameter, such as an offset of an A3 handover event. For example, the network device determines, based on a radio link failure (RLF) report reported by the terminal device, an RLF indication exchanged through an interface, and an HO report, whether the mobility parameter needs to be optimized.

In the NR system, MRO optimization has not been introduced. If the LTE solution is applied to the NR system, because beam-related beam selection, the UL/SUL, and a bandwidth part are introduced into the NR system, the beam, the SUL, or the bandwidth part may cause a radio link failure, and the radio link failure cannot be distinguished and resolved in the current technology, the embodiments of this application provide an information transmission method. When an RLF or a BF occurs, a terminal device may report a radio link failure report (RLF report) or a beam failure recovery report (BFR report) to a network device. The RLF report or the BFR report carries one or more of information about a beam, information about an uplink carrier, or information about a bandwidth part. This helps the network device accurately perform MRO in a timely manner.

Figure 6:
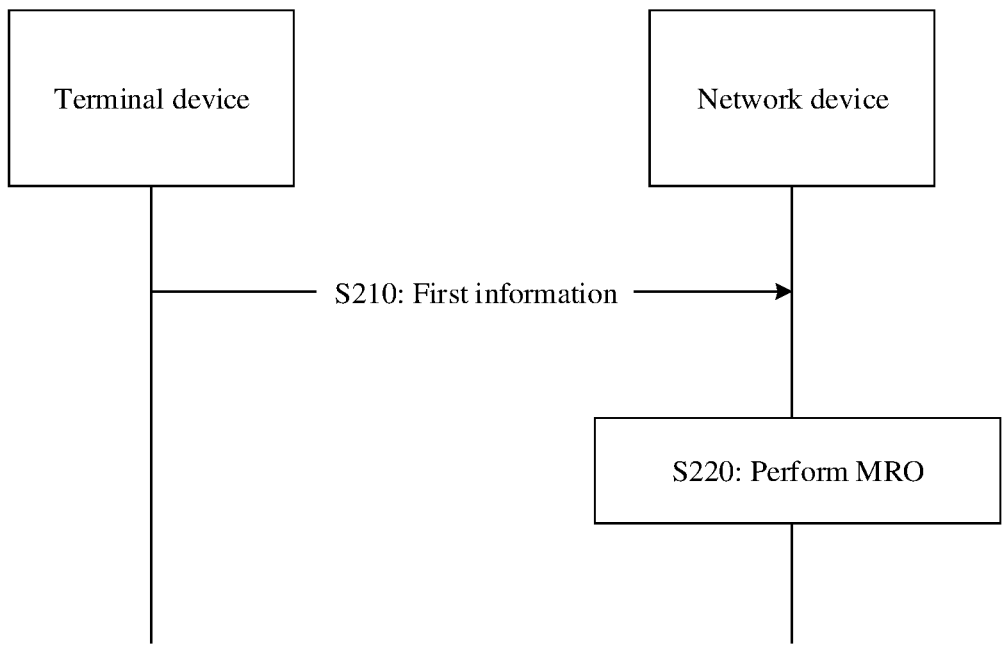
FIG. 6 is a schematic flowchart of an information transmission method according to an embodiment of this application.

FIG. 6 is a schematic flowchart of an information transmission method 200 according to an embodiment of this application. As shown in FIG. 6, an execution body of the method 200 may be a network device, or may be a chip in a network device (the following uses an example in which the execution body is a network device for description). The method 200 includes the following steps.

S210: The network device receives first information from a terminal device, where the first information includes information indicating that a radio link failure occurs between the terminal device and a first cell, or the first information includes information indicating that beam failure recovery occurs between the terminal device and the first cell; and the first information further includes information about a resource, and the information about the resource includes at least one of information about a beam, information about an uplink carrier, or information about a bandwidth part.

Optionally, the first information includes the information indicating that the radio link failure occurs between the terminal device and the first cell.

Optionally, the first information is a radio link failure report (RLF report).

It should be understood that the information about the resource is information about a resource used when the radio link failure occurs on the terminal device.

It should be further understood that the radio link failure report includes at least one of information about the radio link failure and the information about the resource used when the radio link failure occurs.

It should be understood that the technical solutions in the embodiments of this application may be applied to a handover scenario, for example, to the cases of a premature handover, a delayed handover, and a handover to an incorrect cell that are shown in FIG. 2 and FIG. 3. For example, as shown in FIG. 2, the terminal device 131 may send the RLF report to the RAN 111; or the terminal device 131 sends the RLF report to the RAN 112, and the RAN 112 sends an RLF indication to the RAN 111, so that the RAN 111 identifies this handover scenario as a premature handover scenario or a delayed handover scenario. Further, as shown in FIG. 3, the terminal device 131 may send an RLF report to the RAN 113, and the RAN 113 sends an RLF indication to the RAN 111, so that the RAN 111 identifies this handover scenario as a scenario of a handover to an incorrect cell.

The technical solution in this embodiment of this application may also be applied to a single-network device scenario. For example, the first cell is a cell served by a first network device, and the terminal device reestablishes an RRC connection to the first cell within a period of time after the radio link failure occurs in the first cell. The terminal device may send an RLF report to the first network device, and the RLF report includes information about the radio link failure and information about a resource.

Optionally, the information that is about the resource and that is recorded by the terminal device includes information about a resource being used when the RLF occurs on the terminal device, or may be information about a resource that was used (or has been used) when the RLF occurs, or may be information about a resource used for a last service when the RLF occurs, or may be information about a resource used by the terminal device before the RLF occurs.

Optionally, the information about the resource includes the information about the beam, and the information about the beam includes but is not limited to one or more of the following: an identifier of the beam, random access information of the terminal device on the beam, information about a cell to which the beam belongs (a physical cell identifier (PCI), a cell global identifier (CGI), cell frequency information of the cell, or the like), and measurement information of the terminal device on the beam (including measurement of an adjacent beam and measurement of a serving beam). Optionally, the information about the beam further includes measurement information of the cell in which the beam is located and measurement information of a cell in which the adjacent beam is located.

Optionally, the identifier of the beam may be a beam group number (for example, an SSB-index and a CSI-RS-index).

Optionally, the information about the radio link failure includes but is not limited to one or more of the following: (1) a time period from a moment at which the terminal device is handed over to a moment at which a connection failure occurs, and/or a time period from a moment at which the terminal device is handed over to a moment at which the RLF report is reported; (2) a cause why the RLF occurs on the terminal device, where the cause may include, for example, at least one of the following: a timer expiring, a random access problem, a beam recovery failure problem, a quantity of RLC retransmissions reaching a maximum value, and the like; (3) an indication indicating that a connection failure occurs on the terminal device, where the connection failure may include, for example, a handover failure, a beam recovery failure, or a radio link failure; (4) a cell radio network temporary identifier (C-RNTI) allocated in the last serving cell to the terminal device; (5) information (for example, a CGI and a PCI) about a cell in which the terminal device is located when reestablishment occurs and information (for example, an SSB-index and a CSI-RS-index) about a beam used when the reestablishment occurs; and (6) a time period from a moment at which the beam failure occurs on the terminal device to a moment at which the radio link failure occurs on the terminal device, and/or a quantity of beam failures.

Optionally, the random access information includes but is not limited to one or more of the following: a quantity of preamble attempts (number of preambles sent), preamble information used in a preamble attempt, contention indication information (contention detected), load information of a random access channel, load information of a physical uplink shared channel, maximum power reach indication information, failure duration information, access latency information, path loss estimation information, backoff time information, information about data available for transmission (data available for transmission), and a random access type.

The quantity of preamble attempts may be information about a quantity of attempts to send a preamble for access that are made by the terminal device in a process from initiating preamble transmission to successfully performing random access to a network.

The contention indication information may be information about whether contention resolution fails or whether preamble contention is detected.

The maximum power reach indication information may be information about whether a transmitted preamble reaches a maximum power level.

The failure duration information may be information about a time of making a random access attempt by the terminal device.

The access latency information may be information about a time period from a moment at which the terminal device initiates preamble transmission to a moment at which random access succeeds.

The path loss estimation information may be information about a path loss caused when the terminal device performs a random access attempt.

The backoff time information may be information about a latency time of a network backoff control mechanism in a random access process.

The random access type may include at least one of on demand system information (on demand system information), RRC connection establishment, and beam failure recovery (BFR). The random access type of the on demand system information may further include at least one of a type of a random access process message 1 (Msg1) request and a type of a random access process message 3 (Msg3) request.

Optionally, when the cause why the RLF occurs on the terminal device is the random access problem or the beam recovery failure problem, the information about the resource includes the random access information, and the random access information includes information about a beam used when random access fails and/or information about a beam used when random access succeeds.

Optionally, the information about the resource includes the information about the uplink carrier, and in description similar to that of the information about the beam, the identifier of the beam may be replaced with an identifier of the uplink carrier. The identifier of the uplink carrier may be any one or more of frequency information of the uplink carrier, the identifier of the uplink carrier, and the like, and the uplink carrier may be an SUL or a UL.

Optionally, the information about the uplink carrier is information about an uplink carrier used when the RLF occurs on the terminal device, or may be information about an uplink carrier used before the RLF occurs on the terminal device.

Optionally, the information about the resource includes the information about the bandwidth part, and in description similar to that of the information about the beam, the identifier of the beam is replaced with an identifier of the BWP. The information about the BWP may further include any one or more of the following: a location and a bandwidth (location and bandwidth), a subcarrier spacing, used information of an uplink BWP, and used information of a downlink BWP. The used information of the uplink or downlink BWP may include any one or more of the following: a common configuration, a dedicated configuration, and the like.

Optionally, the information about the bandwidth part is information about a bandwidth part used when the RLF occurs on the terminal device, or may be information about a bandwidth part used before the RLF occurs on the terminal device.

It should be understood that, in this embodiment of this application, the first information may be sent to the network device by using an existing RLF report, or may be sent to the network device by using a reestablishment request message, or may be sent by using another existing message or report, or may be sent by using a new report or message. This is not limited in this application.

It should be noted that when the first information is sent to the network device through the reestablishment request message, the reestablishment request message may include at least one type of information or a combination of a plurality of types of information in the first information. This is not limited in this application.

Optionally, the first information includes information indicating that a beam failure occurs between the terminal device and the first cell.

Optionally, the first information is a beam failure recovery report (BFR report), and the BFR report includes information about the beam failure and the information about the resource.

For example, as shown in FIG. 2, the terminal device 131 may send the BFR report to the RAN 112, and the RAN 112 performs MRO after determining a cause of the beam failure.

For another example, the first cell is a cell served by the first network device, a BF occurs on the terminal device in the first cell and BFR succeeds, and the terminal device may send a BFR report to the first network device. The BFR report includes information about the beam failure and information about a resource.

Optionally, the information that is about the resource and that is recorded by the terminal device includes information about a resource used when the BFR/BF occurs on the terminal device, or may be information about a resource that was used (or has been used) when the BFR/BF occurs, or may be information about a resource used for a last service when the BFR/BF occurs, or may be information about a resource used by the terminal device before the BFR/BF occurs.

Optionally, description of information about a beam, information about an uplink carrier, and information about a bandwidth part that are included in the information about the resource is similar to the foregoing description. For brevity, details are not described herein again.

Optionally, the information about the beam failure includes but is not limited to one or more of the following: (1) a time period from a moment at which the beam failure occurs on the terminal device to a moment at which the beam failure recovery succeeds, and/or a time period from a moment at which the beam failure occurs on the terminal device to a moment at which the BFR report is reported; (2) a cause why the beam failure occurs on the terminal device, where the cause may include, for example, at least one of the following: a timer expiring, a random access problem, a quantity of RLC retransmissions reaching a maximum value, and the like; (3) a cell radio network temporary identifier (cell radio network temporary identifier, C-RNTI) allocated in the cell to the terminal device in the last service; and (4) information (for example, a CGI and a PCI) about a cell that is reestablished by the terminal device and/or information (for example, an SSB-index and a CSI-RS-index) about a reestablished beam.

Optionally, the first information further includes at least one of a quantity of beam failures, a quantity of beam failure recovery times, or duration of the beam failure recovery.

Optionally, the at least one of the quantity of beam failures, the quantity of beam failure recovery times, or the duration of the beam failure recovery may alternatively be directly included in the BFR report.

S220: The network device performs mobility robustness optimization based on the first information.

Specifically, in this embodiment of this application, after receiving the first information, the network device may perform mobility robustness optimization. In a handover process, the first network device may be a target network device, or may be a source network device. The following describes in detail a specific optimization process of the network device in a handover scenario with reference to FIG. 7 to FIG. 19.

Figure 7:
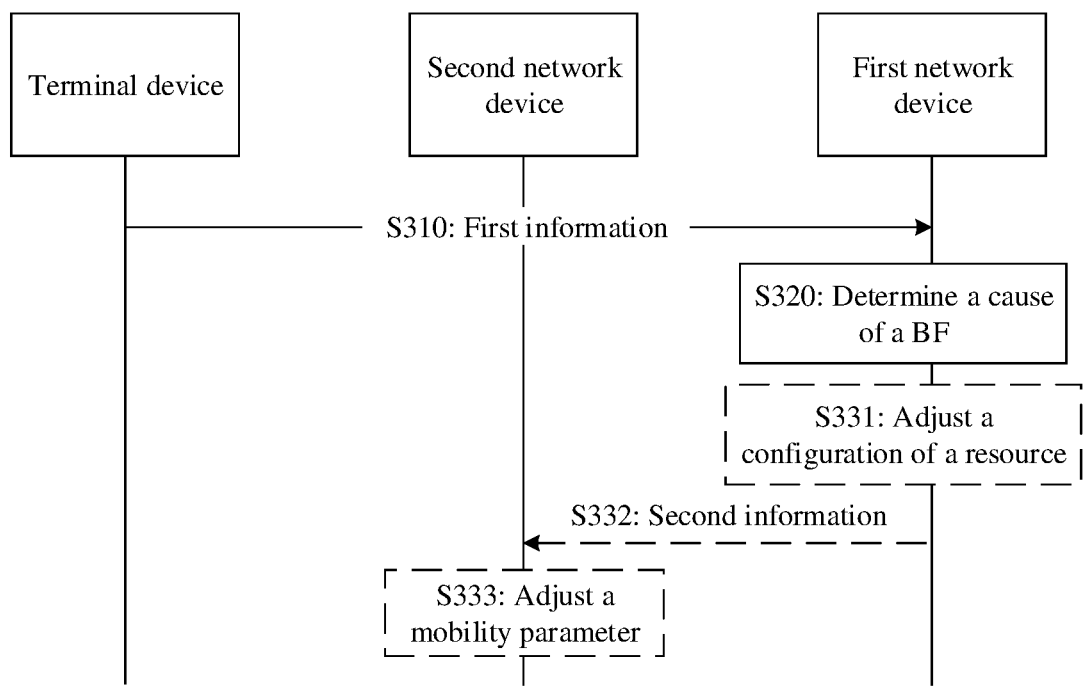
FIG. 7 is another schematic flowchart of an information transmission method according to an embodiment of this application.

FIG. 7 is a schematic flowchart of an information transmission method 300 according to an embodiment of this application. As shown in FIG. 7, the method 300 includes the following steps.

S310: A terminal device sends first information to a first network device, and the first network device receives the first information sent by the terminal device, where the first information includes information indicating that beam failure recovery occurs between the terminal device and a first cell.

Optionally, before the terminal device sends the first information to the first network device, the method 300 further includes:

A second network device sends a handover command to the terminal device, and the terminal device receives the handover command sent by the second network device, where the handover command is used to indicate the terminal device to be handed over from a second cell served by the second network device to the first cell served by the first network device.

The terminal device is handed over from the second cell served by the second network device to the first cell served by the first network device.

A beam failure occurs on the terminal device in the first cell, and the beam failure recovery succeeds.

Specifically, the first network device may be a target network device, the second network device may be a source network device, the first cell is a target cell served by the target network device, the second cell is a source cell served by the source network device, and after the terminal device is handed over to the first cell served by the target network device, the BF occurs and the BFR succeeds. In this case, the terminal device may report the first information to the first network device.

For example, as shown in FIG. 2, the terminal device 131 receives the handover command sent by the source cell A, and the terminal device 131 performs random access (RACH) to the target cell B and successfully accesses the cell B. However, the BFR occurs for a plurality of times in a short period of time (for example, less than 3 s) after the terminal device 131 successfully accesses the target cell B, and the recovery succeeds. Although the recovery succeeds, signal quality and the like of the terminal device in the cell B may not be very good. In this case, the terminal device 131 triggers reporting of the BFR report.

Optionally, before the terminal device sends the first information to the first network device, the method further includes:

The terminal device determines that a quantity of BFs is greater than or equal to a first value; and/or the terminal device determines that a quantity of BFR times is greater than or equal to a second value; and/or the terminal device determines that a timer expires.

The first value, the second value, and the timer may be configured by a network device for the terminal device, or specified in a protocol, or determined in another manner. This is not limited in this application.

Specifically, the reporting of the first information may be triggered by the terminal device in an event trigger manner, where for example, an event is that the quantity of BFs or the quantity of BFR times is greater than or equal to a value, or may be triggered in a timer trigger manner. The first value and the second value in the event trigger manner and the timer may be configured by the network device (for example, the target network device) for the terminal device.

Optionally, the first information is a BFR report.

It should be understood that description of the first information is the same as the description of the first information in the method 200. For brevity, details are not described herein again.

It should be further understood that the BFR report may be reported through an RRC connection between the terminal device and the first network device, or may be reported by using another existing message, or may be reported by using a newly defined message. This is not limited in this embodiment of this application.

S320: The first network device determines a cause of the beam failure.

Optionally, that the first network device determines a cause of the beam failure includes:

The first network device determines that the beam failure is caused by an improper configuration of a resource.

The method 300 further includes the following step.

S331: The first network device adjusts the configuration of the resource.

Optionally, the resource includes one or more of a beam, an uplink carrier, or a bandwidth part, and that the first network device adjusts the configuration of the resource includes any one or more of the following: The first network device adjusts a first threshold corresponding to an SSB; the first network device adjusts a second threshold corresponding to a CSI-RS; the first network device adjusts a third threshold corresponding to a supplementary uplink carrier; or the first network device adjusts a random access channel (RACH) resource, for example, a time-frequency resource corresponding to each SSB or CSI-RS, or a preamble group included in each SSB or CSI-RS, or properly adjusts parameters such as an initial transmit/receive power and a step of a preamble.

Optionally, the method 300 further includes:

The first network device sends fourth information to the second network device, and the second network device receives the fourth information sent by the first network device, where the fourth information is used to indicate an adjusted configuration of the resource.

Optionally, that the first network device determines a cause of the beam failure includes:

The first network device determines that the beam failure is caused by an improper configuration of a mobility parameter.

Optionally, the first network device directly determines that the beam failure is caused by a scenario such as a premature handover scenario or a delayed handover scenario.

The method 300 further includes the following steps:

S332: The first network device sends second information to the second network device, and the second network device receives the second information sent by the first network device, where the second information is used to indicate the second network device to adjust the mobility parameter.

S333: The second network device adjusts the mobility parameter.

Optionally, that the second network device adjusts the mobility parameter includes:

The second network device adjusts a related parameter of an A3 event.

Optionally, the second network device determines, based on the second information, whether the beam failure is caused by the improper configuration of the mobility parameter, that is, determines whether the beam failure is caused by the scenario such as the premature handover scenario or the delayed handover scenario, so as to adjust the mobility parameter.

Optionally, the second information is an indication indicating the premature handover, and the second network device adjusts the mobility parameter after receiving the second information.

In this embodiment of this application, if the first network device determines that the beam failure is caused by a resource configuration problem, the first network device adjusts the configuration of the resource, for example, adjusts related threshold configurations of a beam and an SUL, for a subsequent handover configuration. Otherwise, if the first network device determines that the beam failure is not caused by the resource configuration problem, the first network device sends an indication to the second network device. After receiving the indication, the second network device determines that the beam failure is caused by the premature handover scenario or another newly defined scenario, so as to adjust a related mobility parameter.

It should be understood that a process in which the network device performs mobility robustness optimization in S210 in the method 200 may include S320 and S331, or may include S320, S332, and S333.

Figure 8:
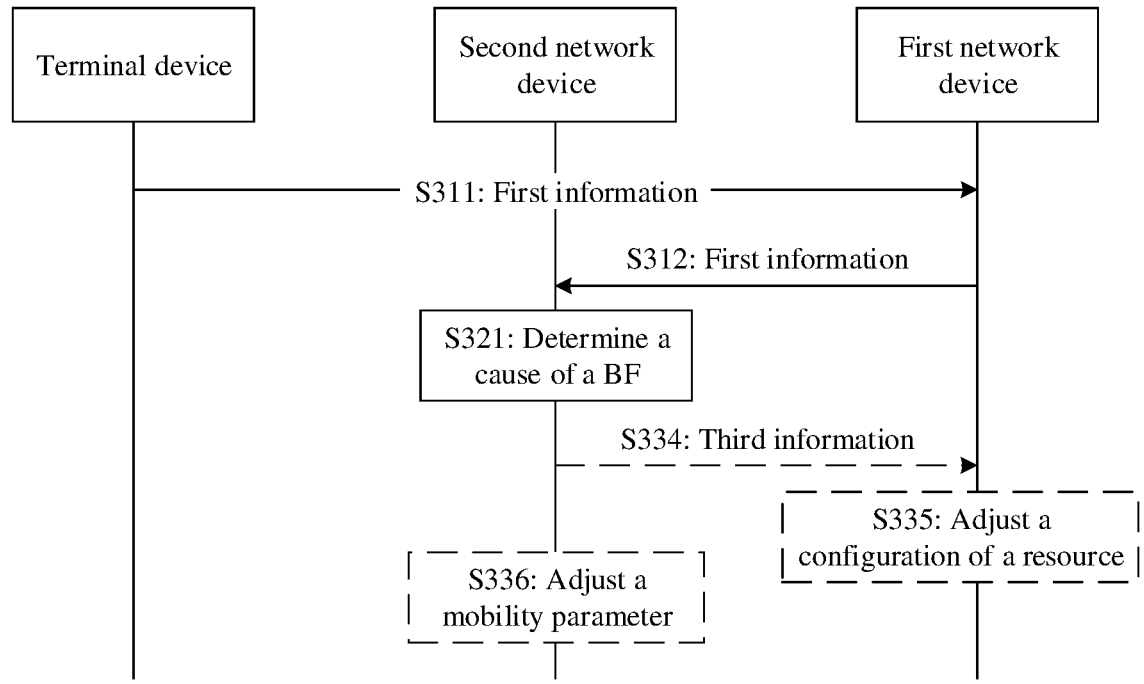
FIG. 8 is another schematic flowchart of an information transmission method according to an embodiment of this application.

FIG. 8 is another schematic flowchart of an information transmission method 300 according to an embodiment of this application. A difference between the method shown in FIG. 7 and the method shown in FIG. 8 lies in that, the cause of the beam failure in the method shown in FIG. 7 may be determined by the target network device (the first network device), and a cause of a beam failure in the method shown in FIG. 8 may be determined by a source network device (a second network device). The method 300 includes the following steps.

S311: A terminal device sends first information to a first network device, and the first network device receives the first information sent by the terminal device, where the first information includes information indicating that beam failure recovery occurs between the terminal device and a first cell.

It should be understood that S311 is the same as S310. For brevity, details are not described herein again.

S312: The first network device sends the first information to the second network device, and the second network device receives the first information sent by the first network device.

Specifically, after receiving the first information, the first network device forwards the first information to the second network device, and the second network device determines the cause of the beam failure.

S321: The second network device determines the cause of the beam failure.

Optionally, that the second network device determines the cause of the beam failure includes:

The second network device determines that the beam failure is caused by an improper configuration of a resource.

The method 300 further includes the following steps:

S334: The second network device sends third information to the first network device, and the first network device receives the third information sent by the second network device, where the third information is used to indicate the first network device to adjust the configuration of the resource.

S335: The first network device adjusts the configuration of the resource.

Optionally, the resource includes one or more of a beam, an uplink carrier, or a bandwidth part, and that the first network device adjusts the configuration of the resource includes any one or more of the following: The first network device adjusts a first threshold corresponding to SSB; the first network device adjusts a second threshold corresponding to CSI-RS; the first network device adjusts a third threshold corresponding to supplementary uplink carrier; or the first network device adjusts a RACH resource, for example, a time-frequency resource corresponding to each SSB or CSI-RS, or a preamble group included in each SSB or CSI-RS, or properly adjusts parameters such as an initial transmit/receive power and a step of a preamble.

Optionally, the third information is used to indicate a configuration, of a specific resource, to be adjusted by the first network device, and the specific resource is one or more of a beam, an uplink carrier, or a bandwidth part.

Optionally, that the second network device determines the cause of the beam failure includes:

The second network device determines that the beam failure is caused by an improper configuration of a mobility parameter.

Optionally, the second network device directly determines that the beam failure is caused by a scenario such as a premature handover scenario or a delayed handover scenario.

The method 300 further includes the following step:

S336: The second network device adjusts the mobility parameter.

It should be understood that when the second network device determines that the beam failure is caused by the improper configuration of the mobility parameter, the second network device determines a handover problem (for example, a premature handover or a delayed handover) and adjusts the mobility parameter.

In this embodiment of this application, if the second network device determines that the beam failure is caused by a resource configuration problem, the second network device indicates the first network device to adjust the configuration of the resource, for example, adjusts related threshold configurations of a beam and an SUL, for a subsequent handover configuration. Otherwise, the second network device determines that the beam failure is not caused by the resource configuration problem but a mobility parameter problem, so that the second network device determines that the beam failure is caused by a premature handover scenario or another newly defined scenario, so as to adjust a related mobility parameter.

According to the information transmission method in this embodiment of this application, when the beam failure occurs, information reported by the terminal device carries information about the resource. This helps a network device accurately perform mobility robustness optimization in a timely manner, thereby avoiding a handover failure and improving a handover success rate.

Figure 9:
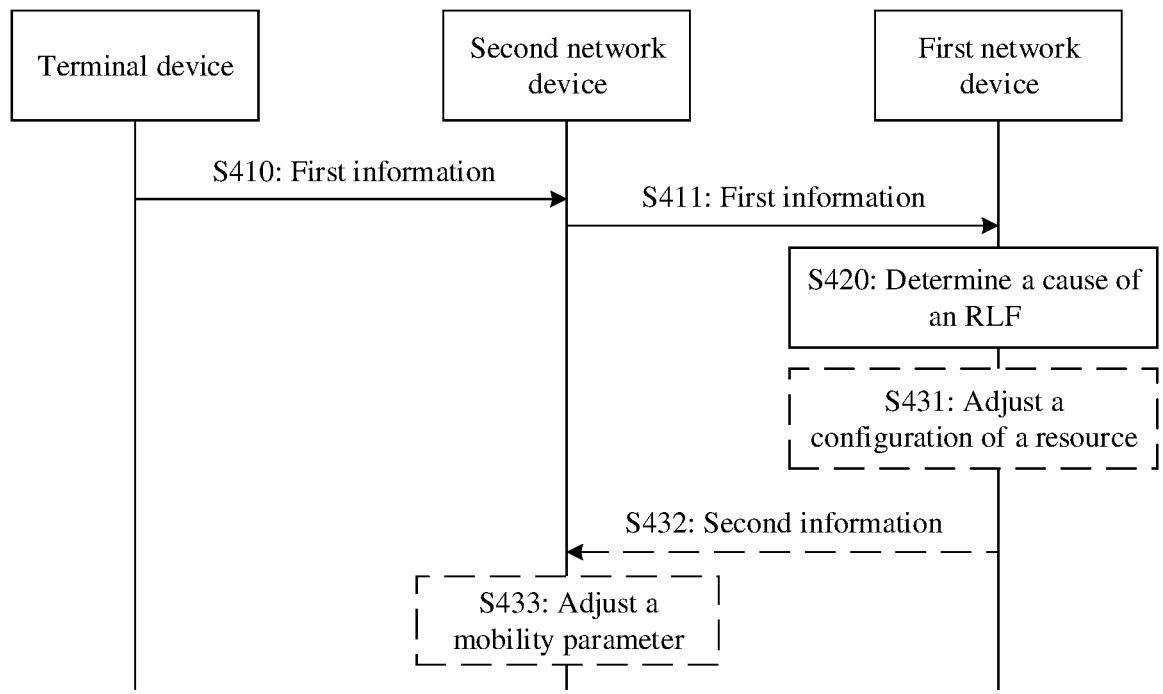
FIG. 9 is another schematic flowchart of an information transmission method according to an embodiment of this application.

FIG. 9 is a schematic flowchart of an information transmission method 400 according to an embodiment of this application. As shown in FIG. 9, the method 400 includes the following steps.

S410: A terminal device sends first information to a second network device, and the second network device receives the first information sent by the terminal device, where the first information includes information indicating that a radio link failure occurs between the terminal device and a first cell.

S411: The second network device sends the first information to a first network device, and the first network device receives the first information sent by the second network device.

Optionally, before the terminal device sends the first information to the second network device, the method 400 further includes:

The second network device sends a handover command to the terminal device, and the terminal device receives the handover command sent by the second network device, where the handover command is used to indicate the terminal device to be handed over from a second cell served by the second network device to the first cell served by the first network device.

The terminal device determines that the radio link failure occurs before the terminal device is handed over to the first cell served by the first network device, or the terminal device determines that the radio link failure occurs after the terminal device is handed over to the first cell served by the first network device.

The terminal device is reconnected to the second cell served by the second network device.

Specifically, the first network device may be a target network device, the second network device may be a source network device, the first cell is a target cell served by the target network device, and the second cell is a source cell served by the source network device. If the radio link failure occurs in a process in which the terminal device is handed over to the first cell, the terminal device may report the first information to the second network device after being reconnected to the second cell. Alternatively, if the radio link failure occurs in a period of time after the terminal device is successfully handed over to the first cell, the terminal device may report the first information to the second network device after being reconnected to the second cell.

For example, as shown in FIG. 2, the terminal device 131 receives the handover command sent by the source cell A, and the terminal device 131 performs random access (RACH) to the target cell B. The RLF occurs in a random access process, and the terminal device 131 is reconnected to the source cell A. In this case, the terminal device 131 triggers reporting of an RLF report to the RAN 111. Alternatively, optionally, the terminal device 131 does not send an RLF report to the RAN 111, and the terminal device 131 directly sends a reestablishment request to the RAN 111.

For another example, as shown in FIG. 2, the terminal device 131 receives the handover command sent by the source cell A, and the terminal device 131 performs random access (RACH) to the target cell B and successfully accesses the cell B. However, the RLF occurs in a short period of time (for example, less than 3 s) after the terminal device 131 successfully accesses the target cell B. In this case, the terminal device 131 triggers reporting of an RLF report to the RAN 111, and the RAN 111 forwards the RLF report to the RAN 112.

It should be understood that, in the foregoing two scenarios, the RLF may be caused by a BFR recovery failure, or may be caused by improper configurations of a UL and an SUL, or may be caused by an improper configuration of a RACH resource, or may be caused by another existing cause. This is not limited in this application.

For example, BFR occurs on the terminal device in the target cell B, but the recovery fails, resulting in an RLF and RRC connection reestablishment to a source cell A. Alternatively, a configuration of a UL/SUL or a configuration of a RACH resource of the target cell B is improper, and consequently, a terminal device cannot successfully access the target cell B, resulting in an RLF and RRC connection reestablishment to a source cell A.

Optionally, the first information is an RLF report.

It should be understood that description of the first information is the same as the description of the first information in the method 200. For brevity, details are not described herein again.

It should be further understood that the RLF report may be reported through an RRC connection between the terminal device and the first network device, or may be reported by using another existing message, or may be reported by using a newly defined message. This is not limited in this embodiment of this application.

S420: The first network device determines a cause of the radio link failure.

Optionally, that the first network device determines a cause of the radio link failure includes:

The first network device determines that the radio link failure is caused by an improper configuration of a resource.

The method 400 further includes the following step:

S431: The first network device adjusts the configuration of the resource.

Optionally, the resource includes one or more of a beam, an uplink carrier, or a bandwidth part, and that the first network device adjusts the configuration of the resource includes any one or more of the following:

The first network device adjusts a first threshold corresponding to SSB; the first network device adjusts a second threshold corresponding to CSI-RS; the first network device adjusts a third threshold corresponding to supplementary uplink carrier; or the first network device adjusts a RACH resource, for example, a time-frequency resource corresponding to each SSB or CSI-RS, or a preamble group included in each SSB or CSI-RS, or properly adjusts parameters such as an initial transmit/receive power and a step of a preamble.

Optionally, that the first network device determines a cause of the radio link failure includes:

The first network device determines that the beam failure is caused by an improper configuration of a mobility parameter.

The method 400 further includes the following steps:

S432: The first network device sends second information to the second network device, and the second network device receives the second information sent by the first network device, where the second information is used to indicate the second network device to adjust the mobility parameter.

S433: The second network device adjusts the mobility parameter.

It should be understood that S420 to S433 are similar to S320 to S333 in the method 300 in FIG. 6. For brevity, details are not described herein again.

Figure 10:
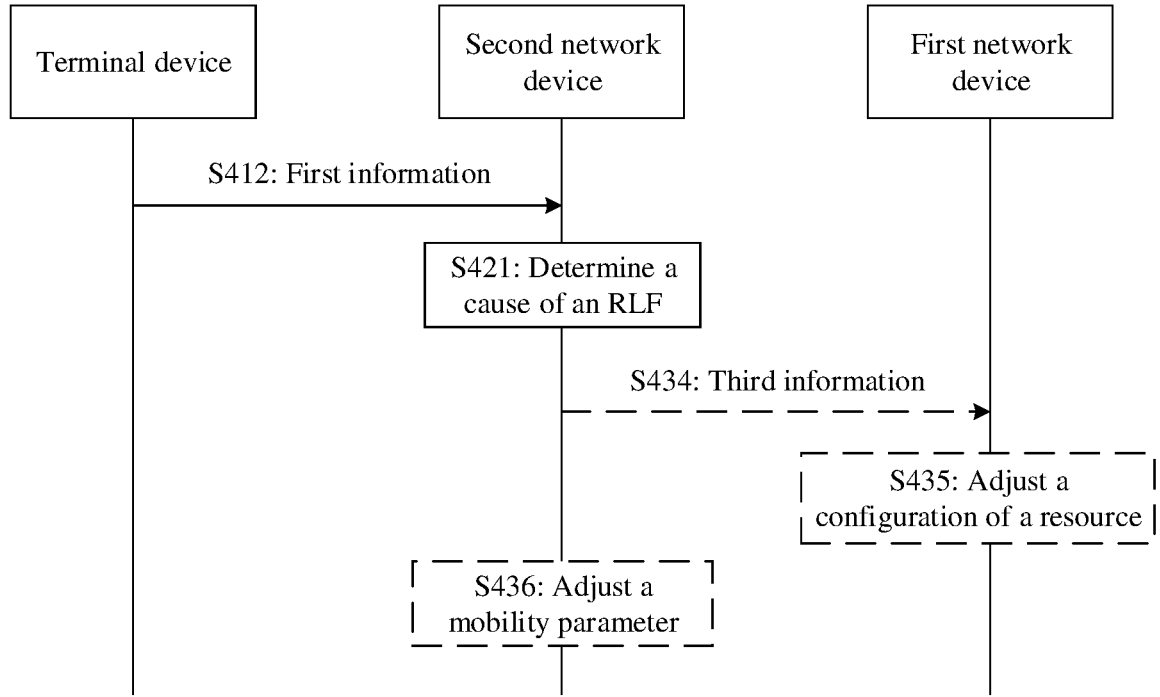
FIG. 10 is another schematic flowchart of an information transmission method according to an embodiment of this application.

FIG. 10 is another schematic flowchart of an information transmission method 400 according to an embodiment of this application. A difference between the method shown in FIG. 9 and the method shown in FIG. 10 lies in that, the cause of the radio link failure in the method shown in FIG. 9 may be determined by the target network device (the first network device), and a cause of a radio link failure in the method shown in FIG. 10 may be determined by a source network device (a second network device). The method 400 includes the following steps.

S412: A terminal device sends first information to the second network device, and the second network device receives the first information sent by the terminal device, where the first information includes information indicating that a radio link failure occurs between the terminal device and a first cell.

It should be understood that in this case, the second network device may not forward the first information to a first network device.

S421: The second network device determines a cause of the radio link failure.

Optionally, that the second network device determines a cause of the radio link failure includes:

The second network device determines that the radio link failure is caused by an improper configuration of a resource.

The method 400 further includes the following steps:

S434: The second network device sends third information to the first network device, and the first network device receives the third information sent by the second network device, where the third information is used to indicate the first network device to adjust the configuration of the resource.

S435: The first network device adjusts the configuration of the resource.

Optionally, the third information is used to indicate a configuration, of a specific resource, to be adjusted by the first network device, and the specific resource is one or more of a beam, an uplink carrier, or a bandwidth part.

It should be understood that a process in which the first network device adjusts the configuration of the resource in the method 400 is the same as the process in which the first network device adjusts the configuration of the resource in the method 300. For brevity, details are not described herein again.

Optionally, that the second network device determines a cause of the radio link failure includes:

The second network device determines that the beam failure is caused by an improper configuration of a mobility parameter.

The method 400 further includes the following step:

S436: The second network device adjusts the mobility parameter.

The foregoing describes in detail, with reference to FIG. 6 to FIG. 10, a mechanism in which a network device performs MRO when a BF or an RLF occurs on a terminal device in a premature handover scenario. The following describes in detail, with reference to FIG. 11 and FIG. 12, a mechanism in which a network device performs MRO when a BF or an RLF occurs on a terminal device in a delayed handover scenario.

Figure 11:
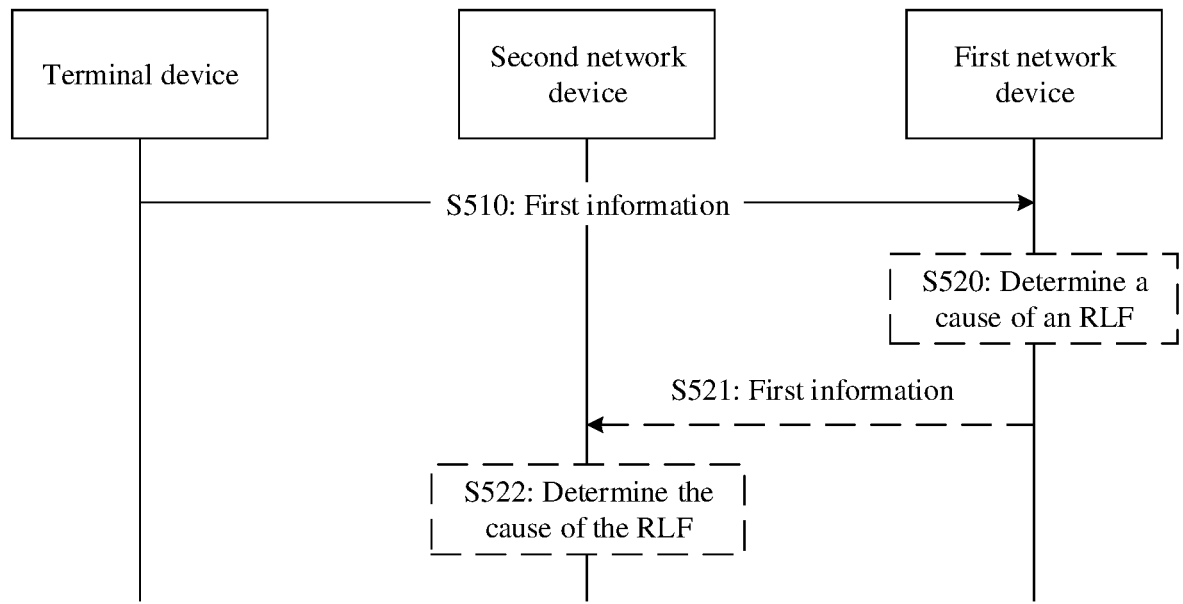
FIG. 11 is another schematic flowchart of an information transmission method according to an embodiment of this application.

FIG. 11 is a schematic flowchart of an information transmission method 500 according to an embodiment of this application. As shown in FIG. 11, the method 500 includes the following steps.

S510: A terminal device sends first information to a first network device, and the first network device receives the first information sent by the terminal device, where the first information includes information indicating that a radio link failure occurs between the terminal device and a first cell.

Specifically, the first network device may be a target network device, a second network device may be a source network device, the first cell is a cell served by the target network device, and a second cell is a cell served by the source network device. The radio link failure occurs in the second cell before the terminal device receives a handover command, the terminal device reestablishes a connection to the first cell, and the terminal device may report the first information to the first network device.

For example, as shown in FIG. 2, the RLF occurs in the cell A before the terminal device 131 receives the handover command sent by the source cell A, and the terminal device 131 reselects the target cell B in the RAN 112. In this case, the terminal device 131 triggers reporting of an RLF report.

Optionally, the first information is an RLF report.

It should be understood that description of the first information is the same as the description of the first information in the method 200. For brevity, details are not described herein again.

S520: The first network device determines a cause of the radio link failure.

It should be understood that S520 is similar to S420 to S433 in FIG. 8. For brevity, details are not described herein again.

Optionally, the second network device may determine the cause of the radio link failure.

The method 500 further includes the following steps:

S521: The first network device forwards the first information to the second network device.

S522: The second network device determines the cause of the radio link failure.

It should be understood that S521 and S522 are similar to S421 to S436 in FIG. 9. For brevity, details are not described herein again.

Figure 12:
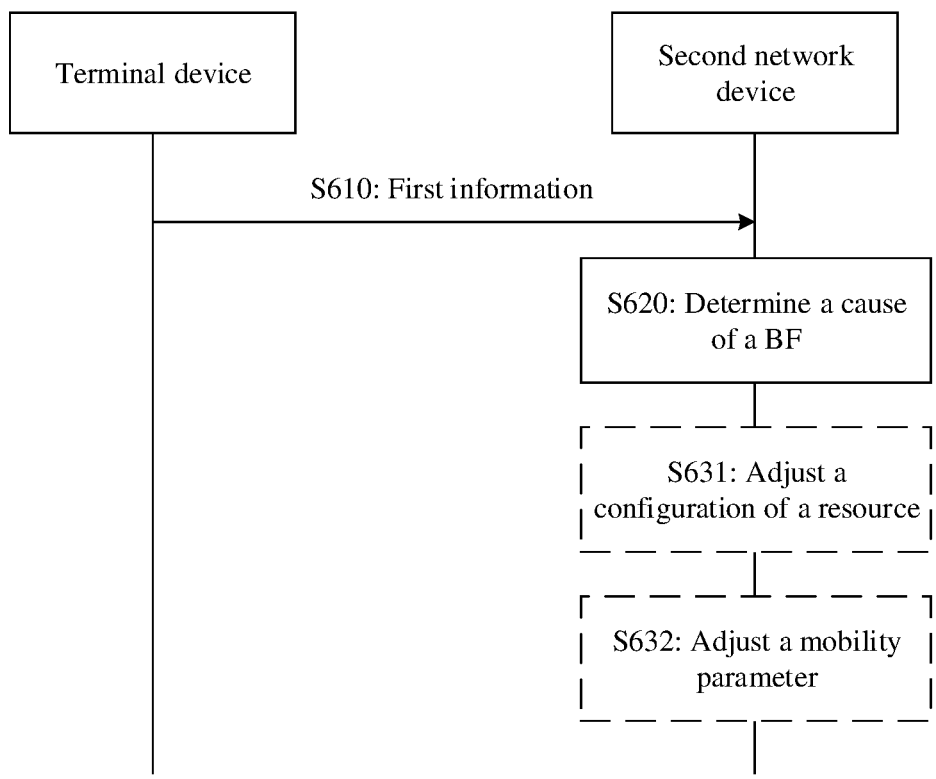
FIG. 12 is another schematic flowchart of an information transmission method according to an embodiment of this application.

FIG. 12 is a schematic flowchart of an information transmission method 600 according to an embodiment of this application. As shown in FIG. 12, the method 600 includes the following steps.

S610: A terminal device sends first information to a second network device, and the second network device receives the first information sent by the terminal device, where the first information includes information indicating that a beam failure occurs between the terminal device and a second cell.

Specifically, a first network device may be a target network device, the second network device may be a source network device, and the second cell is a cell served by the source network device. If the beam failure occurs on the terminal device in the second cell and beam failure recovery succeeds, for example, if beam failures frequently occur in the second cell before the terminal device receives a handover command, and beam failure recovery succeeds, the terminal device may report the first information to the second network device.

For example, as shown in FIG. 2, before the terminal device 131 receives the handover command (indicating the terminal device 131 to be handed over from the cell A to the cell B) sent by the RAN 111, the BF occurs in the cell A but the BFR succeeds. In this case, the terminal device 131 may report a BFR report to the RAN 111.

It should be understood that the BFR report herein is the same as the content in the foregoing embodiments. For brevity, details are not described herein again.

S60: The second network device determines a cause of the beam failure.

Optionally, the second network device determines that the beam failure is caused by an improper configuration of a resource.

The method 600 further includes the following step:

S631: The second network device adjusts the configuration of the resource.

It should be understood that a process in which the second network device adjusts the configuration of the resource is similar to the process in the foregoing embodiments. For brevity, details are not described herein again.

Optionally, the second network device determines the cause of the beam failure.

Optionally, the second network device determines that the beam failure is caused by an improper configuration of a mobility parameter.

The method 600 further includes the following step:

S632: The second network device adjusts the mobility parameter.

Specifically, the second network device may determine whether the beam failure is caused by a resource configuration problem. If the second network device determines that the beam failure is caused by the resource configuration problem, the second network device adjusts the configuration of the resource, for example, adjusts related threshold configurations of a beam and an SUL. Optionally, the second network device may alternatively perform determining based on measurement quality of a neighboring cell in the report. If signal strength of the neighboring cell is relatively good (for example, the signal strength of the neighboring cell is better than that of a serving cell, but a handover event is not satisfied), the second network device determines that the beam failure is caused by a delayed handover scenario or another newly defined scenario, so as to adjust a related downlink mobility parameter.

According to the information transmission method in this embodiment of this application, when the beam failure occurs, information reported by the terminal device carries the information about the resource. This helps a network device accurately perform mobility robustness optimization in a timely manner, thereby avoiding a handover failure and improving a handover success rate.

The foregoing describes in detail, with reference to FIG. 11 and FIG. 12, a mechanism in which a network device performs MRO when a BF or an RLF occurs on a terminal device in a delayed handover scenario. The following describes in detail, with reference to FIG. 13 and FIG. 14, a mechanism in which a network device performs MRO when a BF or an RLF occurs on a terminal device in a scenario of a handover to an incorrect cell.

Figure 13:
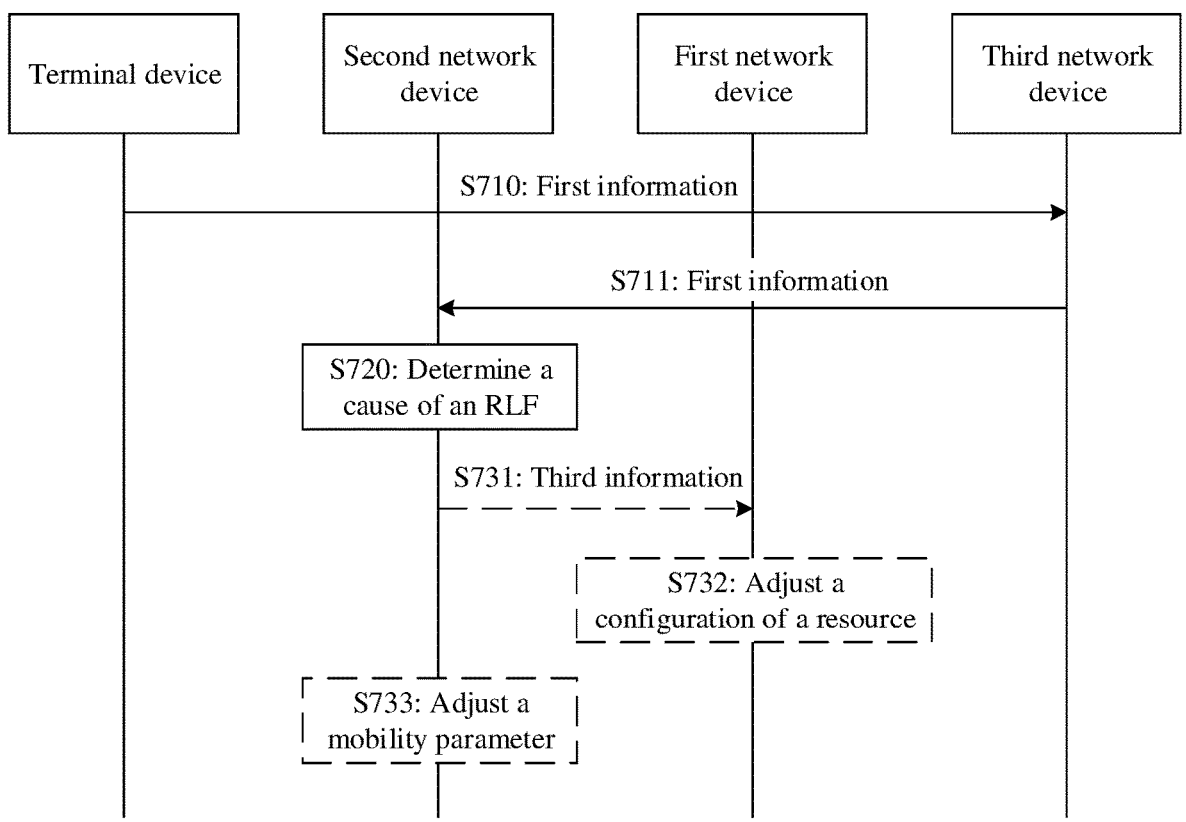
FIG. 13 is another schematic flowchart of an information transmission method according to an embodiment of this application.

FIG. 13 is a schematic flowchart of an information transmission method 700 according to an embodiment of this application. As shown in FIG. 13, the method 700 includes the following steps.

S710: A terminal device sends first information to a third network device, and the third network device receives the first information sent by the terminal device, where the first information includes information indicating that a radio link failure occurs between the terminal device and a first cell.

S711: The third network device sends the first information to a second network device, and the second network device receives the first information sent by the third network device.

It should be understood that the second network device may be the RAN 111 in FIG. 3, and the third network device may be the RAN 113 in FIG. 3.

For example, as shown in FIG. 3, the terminal device 131 receives a handover command sent by the RAN 111, and the command indicates the terminal device 131 to be handed over from the cell A to the cell B. The RLF occurs before the handover is completed, and the terminal device performs cell reselection and reselects the cell C served by the RAN 113. After reestablishment succeeds, the terminal device 131 reports an RLF report to the RAN 113, and the RAN 113 identifies that the RLF occurs on the terminal device 131 in the cell A. In this case, the RAN 113 sends an RLF indication to the RAN 111, so that the RAN 111 records that the terminal device 131 is handed over to an incorrect cell once.

S720: The second network device determines a cause of the radio link failure.

Optionally, that the second network device determines a cause of the radio link failure includes:

The second network device determines that the radio link failure is caused by an improper configuration of a resource.

The method 700 further includes the following steps:

S731: The second network device sends third information to a first network device, and the first network device receives the third information sent by the second network device, where the third information is used to indicate the first network device to adjust the configuration of the resource.

S732: The first network device adjusts the configuration of the resource.

It should be understood that a method for adjusting the configuration of the resource by the first network device may be the same as the method in the method 300. For brevity, details are not described herein again.

Optionally, that the second network device determines a cause of the radio link failure includes:

The second network device determines that the radio link failure is caused by an improper configuration of a mobility parameter.

The method 700 further includes the following step:

S733: The second network device adjusts the mobility parameter.

According to the information transmission method in this embodiment of this application, the terminal device is handed over to an incorrect cell after a beam failure occurs, and information reported by the terminal device carries information about the resource. This helps a network device accurately perform mobility robustness optimization in a timely manner, thereby avoiding a handover failure and improving a handover success rate.

Figure 14:
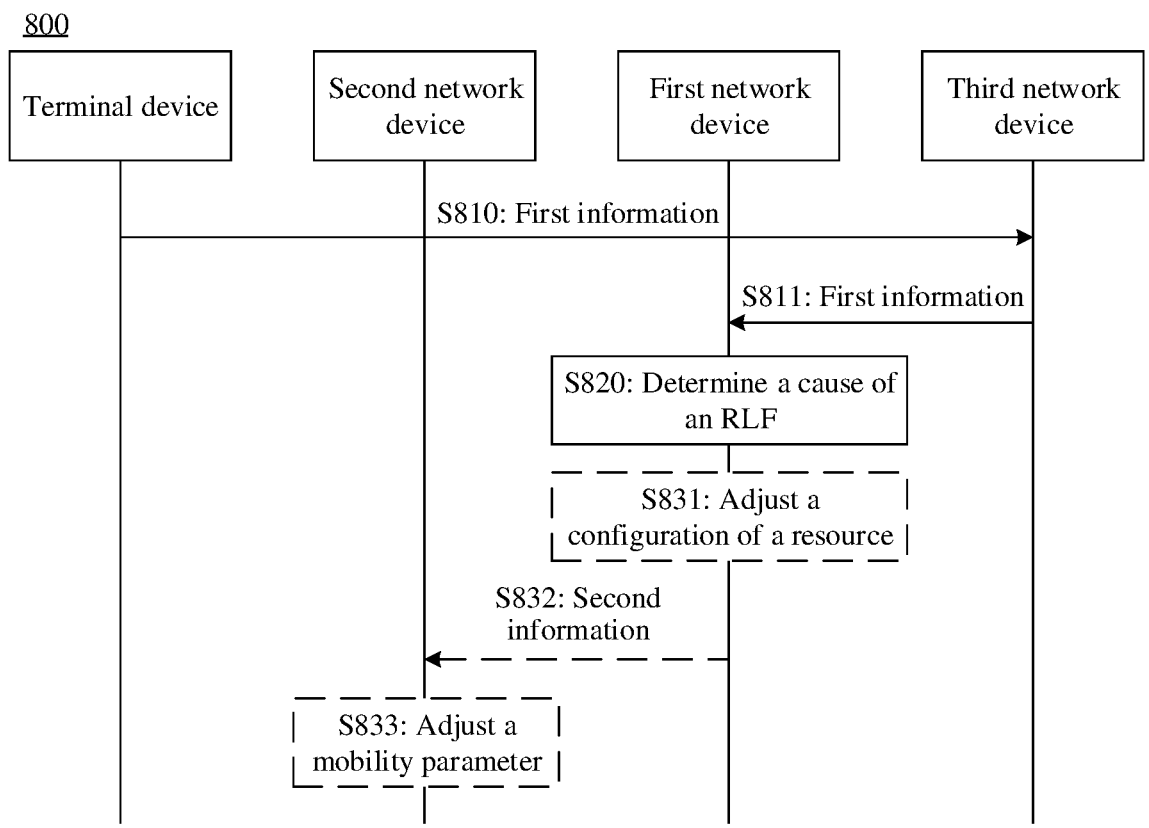
FIG. 14 is another schematic flowchart of an information transmission method according to an embodiment of this application.

FIG. 14 is a schematic flowchart of an information transmission method 800 according to an embodiment of this application. As shown in FIG. 14, the method 800 includes the following steps.

S810: A terminal device sends first information to a third network device, and the third network device receives the first information sent by the terminal device, where the first information includes information indicating that a beam failure occurs between the terminal device and a first cell.

S811: The third network device sends the first information to a first network device, and the first network device receives the first information sent by the third network device.

It should be understood that the first network device may be the RAN 112 in FIG. 3, and the third network device may be the RAN 113 in FIG. 3.

For example, as shown in FIG. 3, the terminal device 131 receives a handover command sent by the RAN 111, the command indicates the terminal device 131 to be handed over from the cell A to the cell B, and the terminal device 131 is successfully handed over to the cell B. However, the RLF occurs within a period of time after the handover succeeds, and the terminal device performs cell reselection and reselects the cell C served by the RAN 113. After reestablishment succeeds, the terminal device 131 reports an RLF report to the RAN 113, and the RAN 113 identifies that the RLF occurs on the terminal device 131 in the cell B. In this case, the RAN 113 sends an RLF indication to the RAN 112, so that the RAN 112 records that the terminal device 131 is handed over to an incorrect cell once.

S820: The first network device determines a cause of a radio link failure.

Optionally, that the first network device determines a cause of a radio link failure includes: The first network device determines that the radio link failure is caused by an improper configuration of a resource.

The method Boo further includes the following step:

S831: The first network device adjusts the configuration of the resource.

It should be understood that a method for adjusting the configuration of the resource by the first network device may be the same as the method in the method 300. For brevity, details are not described herein again.

Optionally, that the first network device determines a cause of a radio link failure includes: The first network device determines that the radio link failure is caused by an improper configuration of a mobility parameter.

The method Boo further includes the following steps:

S832: The first network device sends second information to a second network device, and the second network device receives the second information sent by the first network device, where the second information is used to indicate the second network device to adjust the mobility parameter.

S833: The second network device adjusts the mobility parameter.

According to the information transmission method in this embodiment of this application, the terminal device is handed over to an incorrect cell after the beam failure occurs, and information reported by the terminal device carries information about the resource. This helps a network device accurately perform mobility robustness optimization in a timely manner, thereby avoiding a handover failure and improving a handover success rate.

The foregoing describes in detail, with reference to FIG. 6 to FIG. 14, a mechanism in which a network device performs MRO when a BF or an RLF occurs on a terminal device in a scenario of a premature handover, a delayed handover, and a handover to an incorrect cell. The following describes an information transmission method 900 to an information transmission method 1100 in the embodiments of this application with reference to the accompanying drawings, and the method 900 to the method 1100 describe a mechanism in which a network device performs MRO when a network device is divided into a CU and a DU.

Figure 15:
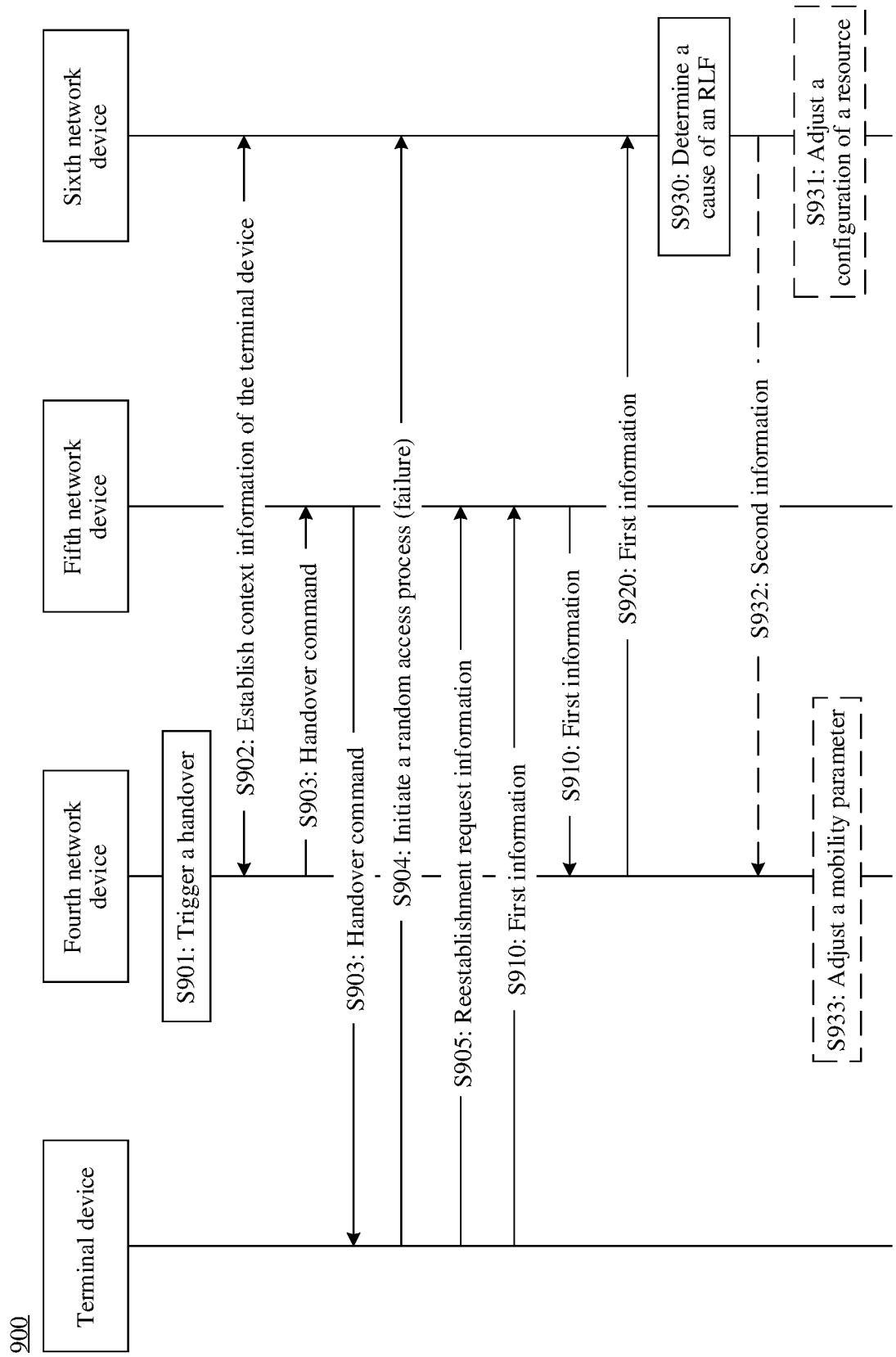
FIG. 15 is another schematic flowchart of an information transmission method according to an embodiment of this application.

FIG. 15 is a schematic flowchart of an information transmission method 900 according to an embodiment of this application. As shown in FIG. 15, the method 900 includes the following steps.

S910: A terminal device sends first information to a fourth network device through a fifth network device, and the fourth network device receives the first information from the terminal device, where the first information includes information indicating that a radio link failure occurs between the terminal device and a first cell.

Optionally, before the terminal device sends the first information to the fourth network device, the method further includes the following steps:

S901: The fourth network device triggers a handover, where the handover is a handover from the fifth network device to a sixth network device.

S902: The fourth network device and the sixth network device establish context information of the terminal device.

S903: The fourth network device sends a handover command to the terminal device through the fifth network device.

Optionally, the handover command is RRC reconfiguration information.

S904: The terminal device fails to initiate a random access process to the sixth network device.

S905: The terminal device sends reestablishment request information to the fifth network device, and reestablishes a connection to the fifth network device.

Optionally, the first information is carried in the reestablishment request information.

It should be understood that S901 to S904 are similar to an existing practice. For brevity, details are not described herein.

It should be further understood that the method 900 may be applicable to a case in which the terminal device successfully initiates the random access process to the sixth network device, but the RLF occurs on the sixth network device, and the terminal device reselects the fifth network device (where a reestablishment message may carry a PCI of the first cell).

It should be further understood that in S901, the fourth network device determines that the handover may be triggered based on an A3 measurement event.

Optionally, the first cell is a cell served by the sixth network device.

Optionally, the fourth network device has at least one of a radio resource control protocol layer function, a service data adaptation layer function, and a packet data convergence protocol layer function; and/or the fifth network device has at least one of a radio link control protocol layer function, a media access control layer function, and a physical layer function; and/or the sixth network device has at least one of a radio link control protocol layer function, a media access control layer function, and a physical layer function.

Optionally, the first information is an RLF report.

It should be understood that the fourth network device may be the CU in FIG. 4, or may be the CU-CP or the CU-UP in FIG. 5. The fifth network device may be the DU 1 in FIG. 4, or the DU 1 in FIG. 5. The sixth network device may be the DU 2 in FIG. 4, or the DU 2 in FIG. 5.

For example, as shown in FIG. 4 or FIG. 5, one CU may communicate with a plurality of DUs, and the CU may trigger a DU change. Before the change, the CU may communicate with the terminal device through the DU 1, and the CU may change the DU, so that the CU communicates with the terminal device through the DU 2. An RLF occurs in a random access process between the terminal device and the target DU 2, the terminal device reselects the source DU 1 and accesses the CU, and the terminal device may carry a PCI of a failed cell in a message reported to the CU.

Optionally, the RLF report may be sent to the CU when the terminal device and the DU 1 reestablish a connection to the CU, or may be directly sent to the CU. Content of the RLF report is the same as that described in the foregoing embodiments. For brevity, details are not described herein again.

S920: The fourth network device sends the first information to the sixth network device, and the sixth network device receives the first information sent by the fourth network device.

Optionally, the fourth network device sends the first information to the sixth network device by using a new message (for example, by using F1AP radio link failure indication (RLF indication) information) or an existing message.

Optionally, the existing message may be an F1AP message, and includes but is not limited to the following messages: a terminal device context setup request/response (UE context setup request/response) message, a terminal device context modification request/response/acknowledgment (UE context modification request/response/required) message, a terminal device context release request/response (UE context release request/response) message, or an F1 interface setup request/response (F1 setup request/response) message.

S930: The sixth network device determines a cause of the radio link failure.

Optionally, that the sixth network device determines a cause of the radio link failure includes:

The sixth network device determines that the radio link failure is caused by an improper configuration of a resource.

The method 900 further includes the following step:

S931: The sixth network device adjusts the configuration of the resource.

For example, the DU 2 determines a problem such as a problem of a RACH resource configuration, a beam configuration, or an SUL/UL configuration based on content of the RLF report. If the problem is a resource configuration problem, the DU 2 directly modifies the configuration.

It should be understood that a method for adjusting the configuration of the resource by the sixth network device may be the same as the method in the method 300. For brevity, details are not described herein again.

Optionally, that the sixth network device determines a cause of the radio link failure includes:

The sixth network device determines that the radio link failure is caused by an improper configuration of a mobility parameter.

The method 900 further includes the following steps:

S932: The sixth network device sends second information to the fourth network device, and the fourth network device receives the second information sent by the sixth network device, where the second information is used to indicate the fourth network device to adjust the mobility parameter.

Optionally, the second information may be further used to indicate that the sixth network device has completed resource configuration modification, or used to indicate a mobility problem, for example, a problem of a premature handover or a delayed handover.

S933: The fourth network device adjusts the mobility parameter.

For example, the DU 2 may send a DU change report to the CU, where the report includes information indicating whether the problem is a configuration problem, configuration modification completion information or information indicating whether the problem is a premature handover problem, or the like. That is, if the problem is not the resource configuration problem of the DU 2, the DU change report sent by the DU 2 indicates that the problem is a premature handover problem, so that the CU optimizes a downlink mobility parameter. Alternatively, if the problem is the resource configuration problem of the DU 2, the DU change report sent by the DU 2 indicates that the resource configuration modification of the DU 2 has been completed. Optionally, the DU change report is sent by using a newly defined F1AP message or an existing F1AP message.

Figure 16:
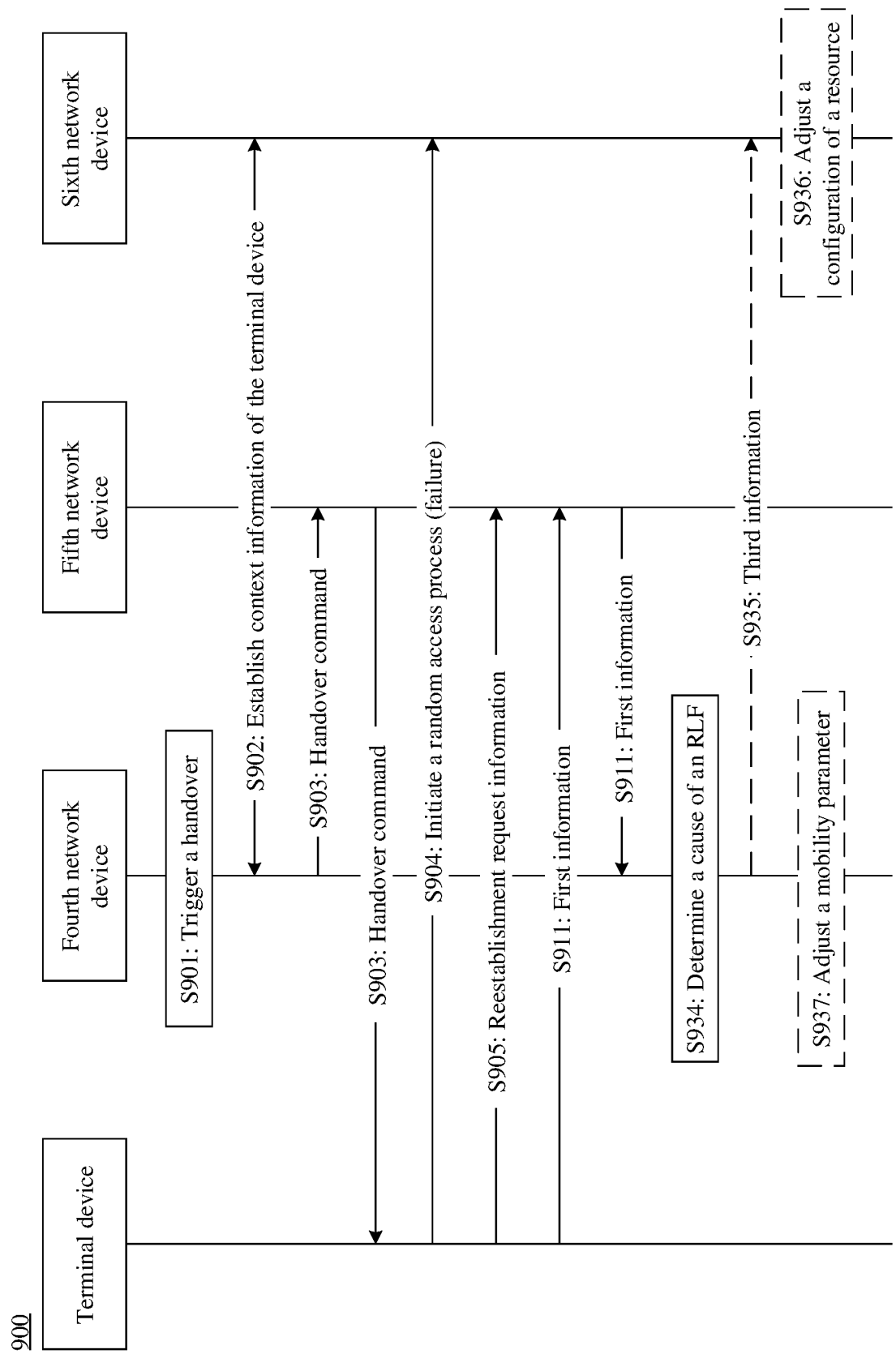
FIG. 16 is another schematic flowchart of an information transmission method according to an embodiment of this application.

In an embodiment, FIG. 16 is another schematic flowchart of an information transmission method 900 according to an embodiment of this application. As shown in FIG. 16, the method 900 includes the following steps.

S911: A terminal device sends first information to a fourth network device through a fifth network device, and the fourth network device receives the first information sent by the terminal device, where the first information includes information indicating that a radio link failure occurs between the terminal device and a first cell.

It should be understood that S911 is the same as S910. For brevity, details are not described herein again.

S934: The fourth network device determines a cause of the radio link failure.

Optionally, that the fourth network device determines a cause of the radio link failure includes:

The fourth network device determines that the radio link failure is caused by an improper configuration of a resource.

The method 900 further includes the following steps:

S935: The fourth network device sends third information to a sixth network device, and the sixth network device receives the third information sent by the fourth network device, where the third information is used to indicate the sixth network device to adjust the configuration of the resource.

S936: The sixth network device adjusts the configuration of the resource.

Optionally, the third information is used to indicate a configuration, of a specific resource, to be adjusted by the sixth network device, and the specific resource is one or more of a beam, an uplink carrier, or a bandwidth part.

For example, a DU 2 modifies a configuration of a corresponding resource based on an indication of the third information.

It should be understood that the configuration of the resource is the same as the configuration of the resource in the foregoing method 300. For brevity, details are not described herein again.

It should be further understood that a method for adjusting the configuration of the resource by the sixth network device may be the same as the method in the method 300. For brevity, details are not described herein again.

For example, a CU determines a problem based on an RLF report, for example, determines that the problem is a premature handover problem of the DU 2 or a configuration problem of the DU 2. The configuration problem may include a problem of at least one of a RACH resource configuration, a beam configuration, a bandwidth part BWP configuration, an SUL/UL configuration, and the like. If the problem is a resource configuration problem, the CU sends a problem indication to the DU 2. The problem indication may be a RACH resource configuration problem indication, a beam problem indication, a BWP configuration problem indication, an SUL/UL configuration problem indication, or the like. Therefore, the DU 2 modifies a corresponding resource configuration.

The DU 2 may send a DU change report to the CU, where the report includes information indicating whether the problem is a configuration problem, configuration modification completion information, and the like.

Optionally, that the fourth network device determines a cause of the radio link failure includes:

The fourth network device determines that the radio link failure is caused by an improper configuration of a mobility parameter.

The method 900 further includes the following step:

S937: The fourth network device adjusts the downlink mobility parameter.

For example, if the CU determines that the RLF is caused by a DU premature handover, the CU directly optimizes the downlink mobility parameter. Optionally, the optimized downlink mobility parameter includes a related parameter of an A3 event.

The foregoing describes in detail, with reference to FIG. 15 and FIG. 16, a mechanism in which a network device performs MRO when an RLF occurs on a terminal device in a DU premature handover. The following describes, with reference to FIG. 17 and FIG. 18, a mechanism in which a network device performs MRO when a BF occurs on a terminal device in a DU premature handover.

Figure 17:
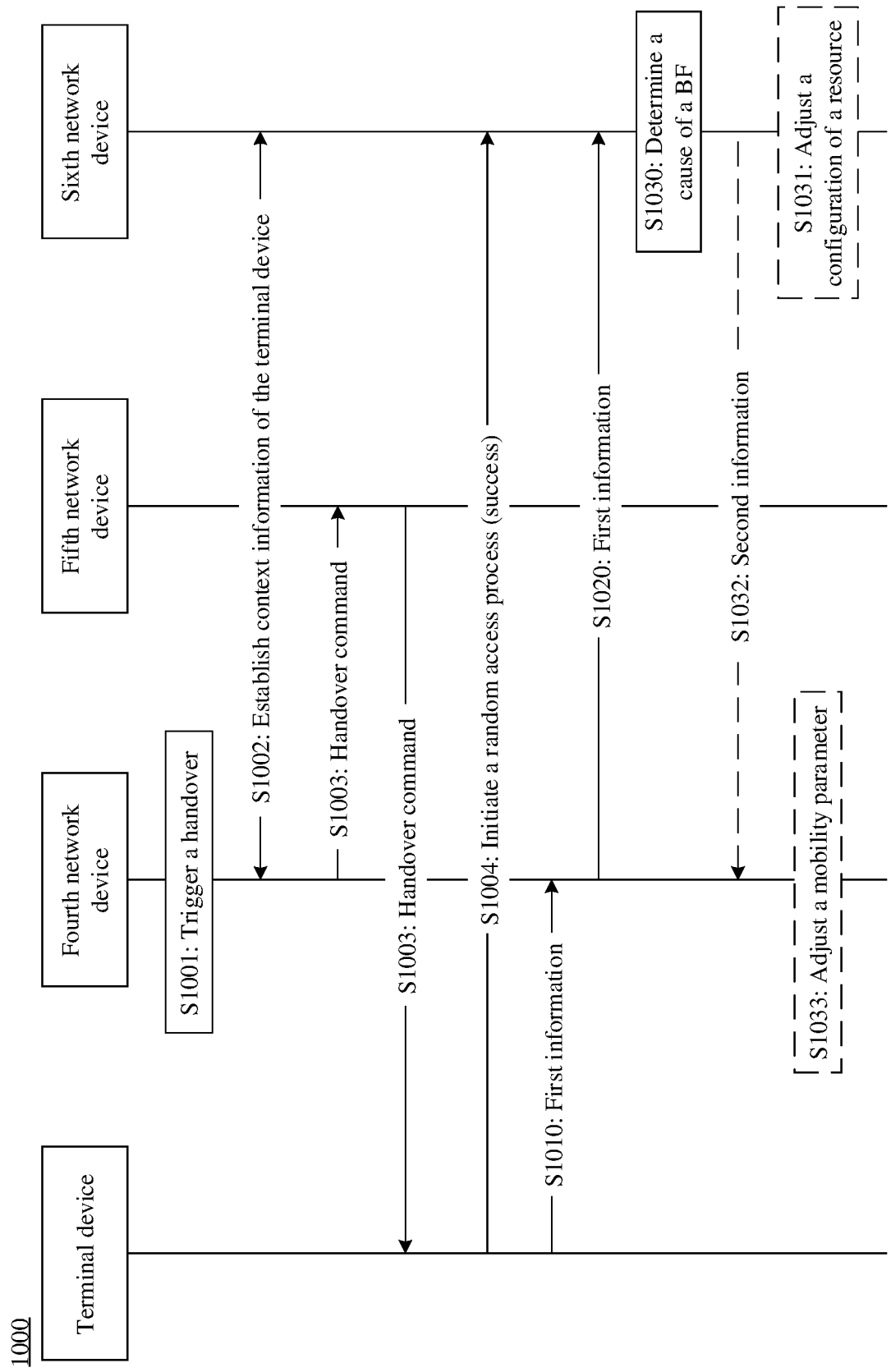
FIG. 17 is another schematic flowchart of an information transmission method according to an embodiment of this application.

FIG. 17 is a schematic flowchart of an information transmission method 1000 according to an embodiment of this application. As shown in FIG. 17, the method 1000 includes the following steps.

S1010: A terminal device sends first information to a fourth network device, and the fourth network device receives the first information sent by a sixth network device, where the first information includes information indicating that a beam failure occurs between the terminal device and a first cell.

Optionally, that a terminal device sends first information to a fourth network device includes:

The terminal device directly sends the first information to the fourth network device.

Alternatively, the terminal device sends the first information to the fourth network device through the sixth network device.

Optionally, the first information includes a BFR report.

It should be understood that description of the BFR report is the same as that in the foregoing embodiments. For brevity, details are not described herein again.

Optionally, before the terminal device sends the first information to the fourth network device, the method further includes the following steps:

S1001: The fourth network device triggers a handover, where the handover is a handover from a fifth network device to the sixth network device.

S1002: The fourth network device and the sixth network device establish context information of the terminal device.

S1003: The fourth network device sends a handover command to the terminal device through the fifth network device.

Optionally, the handover command is RRC reconfiguration information.

S1004: The terminal device successfully initiates a random access process to the sixth network device, but BFR occurs for a plurality of times on the terminal device in the first cell and no RLF occurs.

It should be understood that S1001 to S1004 are similar to an existing practice. For brevity, details are not described herein.

Optionally, before the terminal device sends the first information to the fourth network device, the method further includes:

The terminal device determines that a quantity of BFs is greater than or equal to a first value; and/or the terminal device determines that a quantity of BFR times is greater than or equal to a second value; and/or the terminal device determines that a timer expires.

Specifically, the reporting of the first information may be triggered by the terminal device in an event trigger manner, where for example, an event is that the quantity of BFs or the quantity of BFR times is greater than or equal to a value, or may be triggered in a timer (timer) trigger manner. The first value and the second value in the event trigger manner and the timer may be configured by a network device (for example, a CU) for the terminal device.

Optionally, the first cell is a cell served by the sixth network device.

Optionally, the fourth network device has at least one of a radio resource control protocol layer function, a service data adaptation layer function, and a packet data convergence protocol layer function; and/or the fifth network device has at least one of a radio link control protocol layer function, a media access control layer function, and a physical layer function; and/or the sixth network device has at least one of a radio link control protocol layer function, a media access control layer function, and a physical layer function.

It should be understood that the fourth network device may be the CU in FIG. 4, or may be the CU-CP or the CU-UP in FIG. 5. The fifth network device may be the DU 1 in FIG. 4, or the DU 1 in FIG. 5. The sixth network device may be the DU 2 in FIG. 4, or the DU 2 in FIG. 5.

For example, as shown in FIG. 4 or FIG. 5, the CU triggers a DU handover, and then the CU and the target DU 2 establish a context of the terminal device. The CU sends a handover command (for example, RRC reconfiguration information) to the terminal device through the source DU 1, so that the terminal device performs random access to the target DU 2, and the terminal device successfully performs random access to the DU 2. However, in a short period of time after the random access succeeds, BFs occur frequently but BFR succeeds, and no RLF occurs.

The terminal device records and sends a BFR report to the CU. For example, the BFR report of the terminal device is directly reported to the CU (for example, by using an RRC message), or is first reported to the DU 2 (for example, by using a layer 1 message or a layer 2 message) and then is sent to the CU through the DU 2.

S1020: The fourth network device sends the first information to the sixth network device, and the sixth network device receives the first information sent by the fourth network device.

Optionally, the fourth network device sends the first information to the sixth network device by using a new message (for example, a newly defined F1AP beam failure recovery indication (BFR indication) message) or an existing F1AP message.

Optionally, the existing F1AP message includes but is not limited to the following messages:

a terminal device context setup request/response (UE context setup request/response) message, a terminal device context modification request/response/acknowledgment (UE context modification request/response/required) message, a terminal device context release request/response (UE context release request/response/required) message, or an F1 interface setup request/response (F1 setup request/response) message.

S1030: The sixth network device determines a cause of the beam failure.

Optionally, that the sixth network device determines a cause of the beam failure includes:

The sixth network device determines that the beam failure is caused by an improper configuration of a resource.

The method 1000 further includes the following step:

S1031: The sixth network device adjusts the configuration of the resource.

For example, the DU 2 determines a problem such as a problem of a RACH resource configuration, a beam configuration, or an SUL/UL configuration based on content of the BFR report. If the problem is a resource configuration problem, the DU 2 directly modifies the configuration.

It should be understood that a method for adjusting the configuration of the resource by the sixth network device may be the same as the method in the method 300. For brevity, details are not described herein again.

Optionally, that the sixth network device determines a cause of the beam failure includes:

The sixth network device determines that the beam failure is caused by an improper configuration of a mobility parameter.

The method 1000 further includes the following steps:

S1032: The sixth network device sends second information to the fourth network device, and the fourth network device receives the second information sent by the sixth network device, where the second information is used to indicate the fourth network device to adjust the mobility parameter.

S1033: The fourth network device adjusts the mobility parameter.

For example, the DU 2 may send a DU change report to the CU, where the report includes information indicating whether the problem is a configuration problem, configuration modification completion information or information indicating whether the problem is a premature handover problem, or the like. That is, if the problem is not the resource configuration problem of the DU 2, the DU change report sent by the DU 2 indicates that the problem is a premature handover problem, so that the CU optimizes a downlink mobility parameter. Alternatively, if the problem is the resource configuration problem of the DU 2, the DU change report sent by the DU 2 indicates that resource configuration modification of the DU 2 has been completed. Optionally, the DU change report may be sent by using a newly defined F1AP message or an existing F1AP message.

Figure 18:
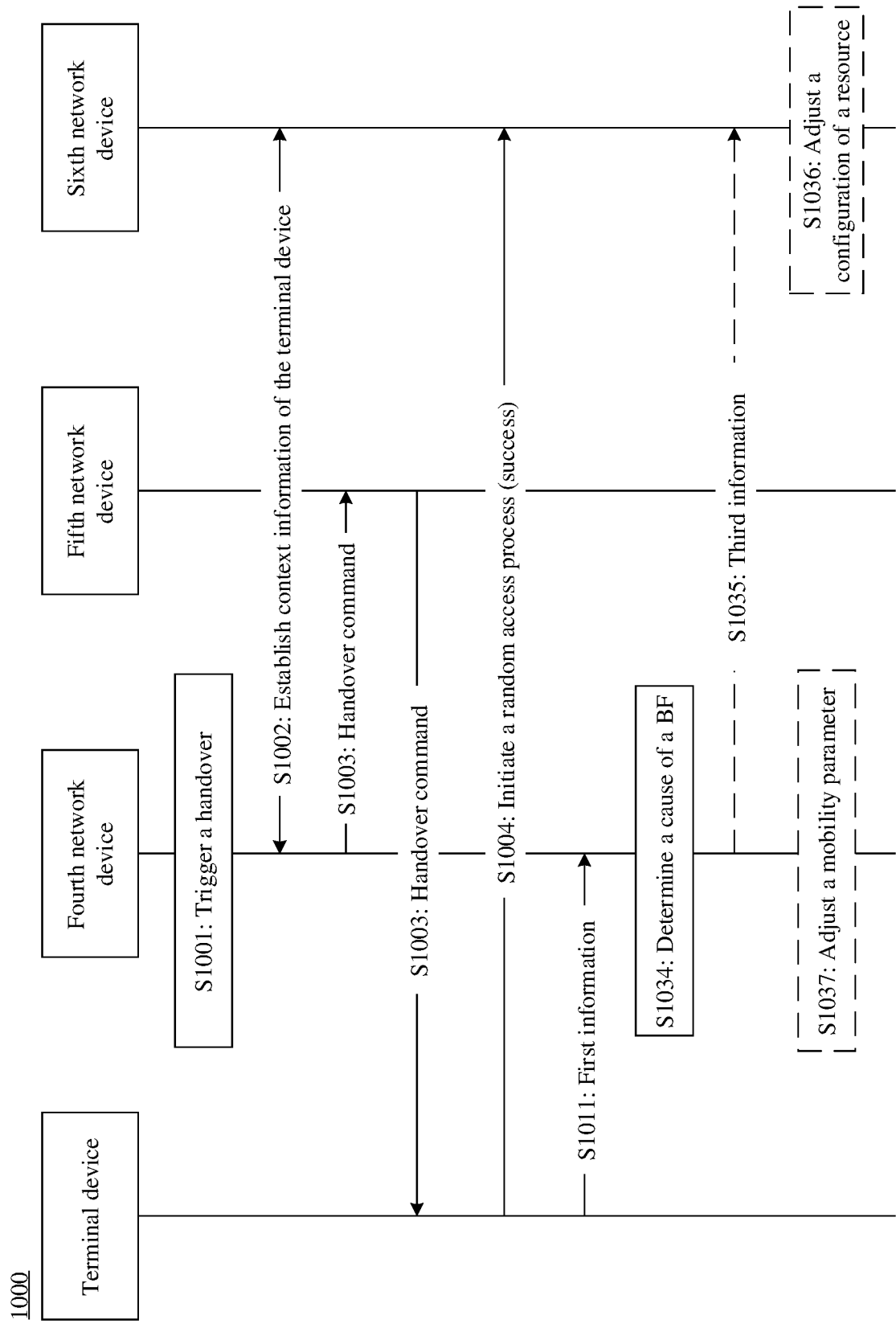
FIG. 18 is another schematic flowchart of an information transmission method according to an embodiment of this application.

In an embodiment, FIG. 18 is another schematic flowchart of an information transmission method 1000 according to an embodiment of this application. As shown in FIG. 18, the method 1000 includes the following steps.

S1011: A terminal device sends first information to a fourth network device, where the first information includes information indicating that a beam failure occurs between the terminal device and a first cell.

Optionally, that a terminal device sends first information to a fourth network device includes:

The terminal device directly sends the first information to the fourth network device.

Alternatively, the terminal device sends the first information to the fourth network device through a sixth network device.

Optionally, the first information is a BFR report.

It should be understood that content of the BFR report is the same as the content of the BFR report in the foregoing embodiments. For brevity, details are not described herein again.

It should be understood that a process of S1011 is the same as that of S1010. For brevity, details are not described herein again.

S1034: The fourth network device determines a cause of the beam failure.

Optionally, that the fourth network device determines a cause of the beam failure includes:

The fourth network device determines that the beam failure is caused by an improper configuration of a resource.

The method 1000 further includes the following steps:

S1035: The fourth network device sends third information to the sixth network device, and the sixth network device receives the third information sent by the fourth network device, where the third information is used to indicate the sixth network device to adjust the configuration of the resource.

S1036: The sixth network device adjusts the configuration of the resource.

For example, a CU determines a problem based on the BFR report, for example, determines that the problem is a premature handover problem of a DU 2 or a configuration problem of the DU 2. The configuration problem may include a problem of at least one of a RACH resource configuration, a beam configuration, an SUL/UL configuration, and the like. If the problem is a resource configuration problem, the CU sends a problem indication to the DU 2. The problem indication may be a RACH resource configuration problem indication, a beam problem indication, an SUL/UL configuration problem indication, or the like. Therefore, the DU 2 modifies a corresponding configuration.

The DU 2 may send a DU change report to the CU, where the report includes information indicating whether the problem is a configuration problem, configuration modification completion information, and the like.

Optionally, the method further includes:

The sixth network device sends fourth information to the fourth network device, and the fourth network device receives the fourth information sent by the sixth network device, where the fourth information is used to indicate a modified configuration of the resource.

Optionally, that the fourth network device determines a cause of the beam failure includes:

The fourth network device determines that the beam failure is caused by an improper configuration of a mobility parameter.

The method 1000 further includes the following step:

S1037: The fourth network device adjusts the downlink mobility parameter.

For example, if the CU determines that an RLF is caused by a DU premature handover, the CU directly optimizes the downlink mobility parameter. Optionally, the optimized downlink mobility parameter includes a related parameter of an A3 event.

According to the information transmission method in this embodiment of this application, when a BF or an RLF occurs in a DU handover process in a CU-DU architecture, information reported by the terminal device carries information about the resource. This helps a network device accurately perform mobility robustness optimization in a timely manner, thereby avoiding a handover failure and improving a handover success rate.

The foregoing describes in detail, with reference to FIG. 15 to FIG. 18, a mechanism in which a network device performs MRO when an RLF or a BF occurs on a terminal device in a DU premature handover. The following describes, with reference to FIG. 19 and FIG. 20, a mechanism in which a network device performs MRO when an RLF or a BF occurs on a terminal device in a DU delayed handover.

Figure 19:
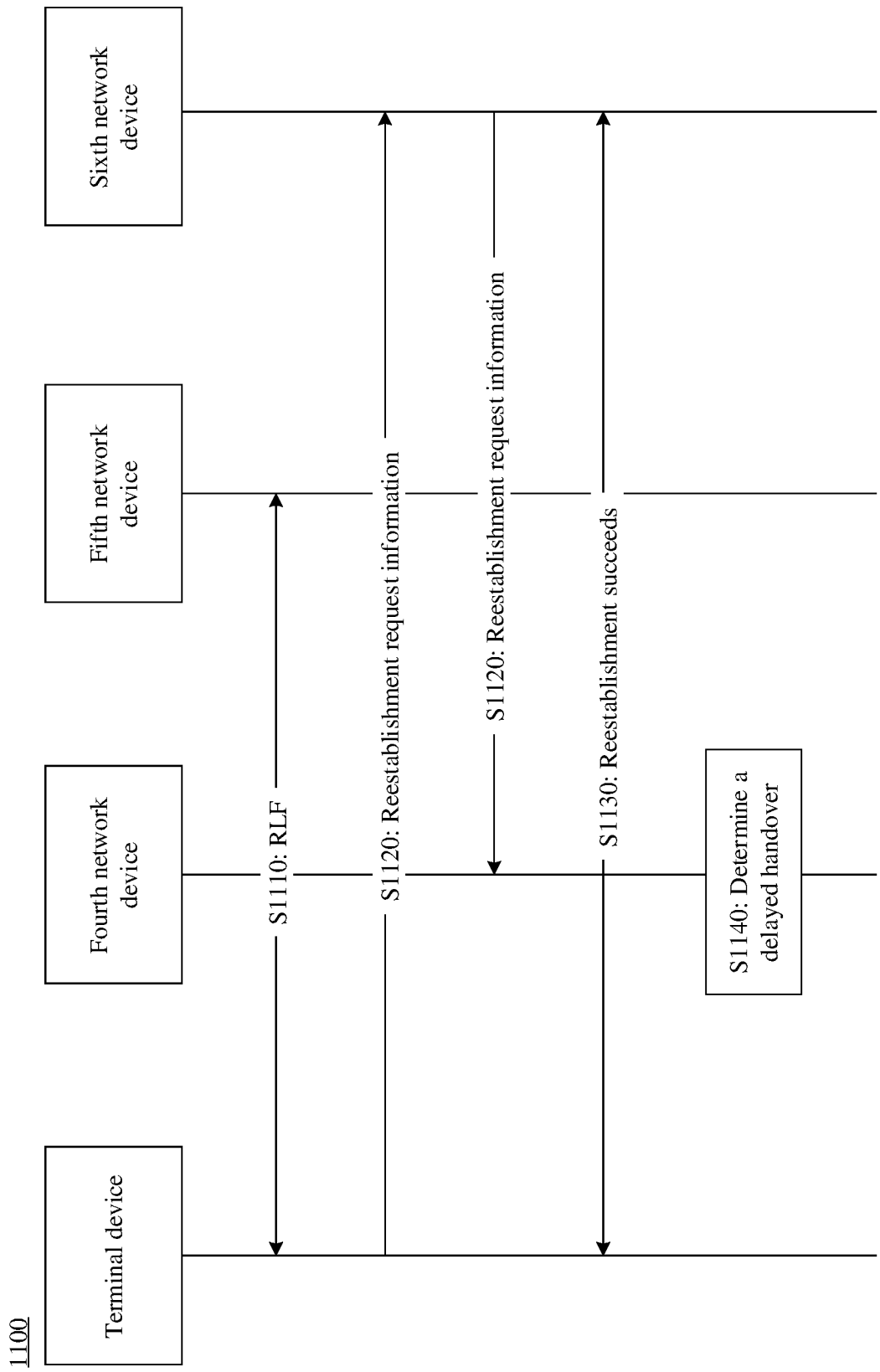
FIG. 19 is another schematic flowchart of an information transmission method according to an embodiment of this application.

FIG. 19 is a schematic flowchart of an information transmission method 1100 according to an embodiment of this application. As shown in FIG. 19, the method 1100 includes the following steps.

S1110: An RLF occurs on a terminal device in a fifth network device.

S1120: The terminal device sends reestablishment request information to a fourth network device through a sixth network device, where the reestablishment request information includes identification information of the fifth network device.

S1130: The terminal device reselects the sixth network device, and reestablishment succeeds.

S1140: After receiving the reestablishment request information, the fourth network device may determine that a reestablished cell is a cell served by the sixth network device and has identification information different from that of a current serving cell, and the sixth network device may directly determine a delayed handover.

For example, as shown in FIG. 4 or FIG. 5, the RLF occurs on the terminal device in a DU 1, and then the terminal device reselects a target DU 2 and reestablishment succeeds. An RRC reestablishment request message of the terminal device includes a cell identifier of the failed DU 1. In this case, after receiving the reestablishment request, a CU may learn that the reestablished cell is served by the DU 2, and an identifier of the reestablished cell is different from an identifier of the current serving cell. Therefore, the CU may directly determine one delayed DU handover.

It should be understood that, a delayed handover scenario may further include: A BF occurs on the terminal device in the DU 1 but BFR succeeds, the terminal device sends a BFR report to the CU through the DU 1, and the BFR report includes a measurement result of a neighboring cell. After receiving the BFR report, the CU determines a problem (a resource configuration problem or a delayed DU handover problem). If the problem is a configuration problem, the CU sends a problem indication to the DU 1, so that the DU 1 performs reconfiguration. Otherwise, the CU counts one delayed handover. This process is similar to the process in the foregoing method 1000. For brevity, details are not described herein.

According to the information transmission method in this embodiment of this application, when a BF or an RLF occurs in a DU handover process in a CU-DU architecture, information reported by the terminal device carries information about a resource. This helps a network device accurately perform mobility robustness optimization in a timely manner, thereby avoiding a handover failure and improving a handover success rate.

The foregoing describes in detail the information transmission method in the embodiments of this application with reference to FIG. 6 to FIG. 19. The following describes in detail information transmission apparatuses in the embodiments of this application with reference to the accompanying drawings.

An embodiment of this application further provides an apparatus configured to implement any one of the foregoing methods. For example, an apparatus is provided, including units (or means) configured to implement the steps performed by the network device in any one of the foregoing methods. For another example, another apparatus is further provided, including units (or means) configured to implement the steps performed by the terminal device in any one of the foregoing methods.

Figure 20:
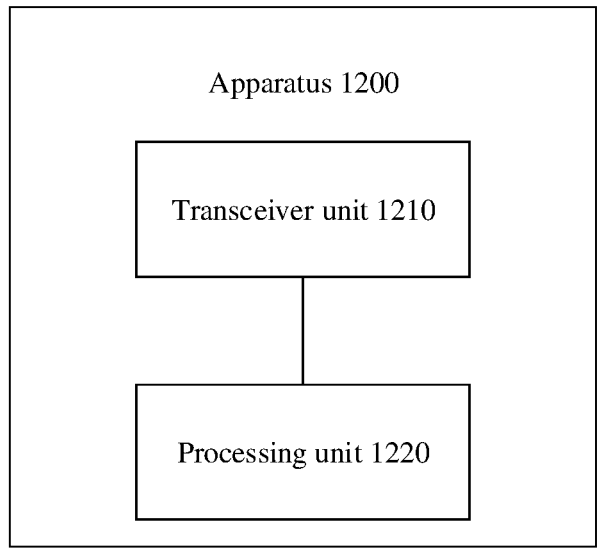
FIG. 20 is a schematic block diagram of an information transmission apparatus according to an embodiment of this application.

FIG. 20 is a schematic block diagram of an information transmission apparatus 1200 according to an embodiment of this application. As shown in FIG. 20, the information transmission apparatus 1200 may include a transceiver unit 1210 and a processing unit 1220.

In a possible design, the information transmission apparatus may be the first network device, the second network device, the fourth network device, or the sixth network device in the method 300 to the method 1100, or may be a chip configured in a corresponding network device.

Specifically, the transceiver unit 1210 is configured to receive first information from a terminal device, where the first information includes information indicating that a radio link failure occurs between the terminal device and a first cell, or the first information includes information indicating that beam failure recovery occurs between the terminal device and the first cell.

The first information further includes information about a resource, and the information about the resource includes at least one of information about a beam, information about an uplink carrier, or information about a bandwidth part.

The processing unit 1220 is configured to perform mobility robustness optimization based on the first information.

Optionally, when the first information includes the information indicating that the beam failure recovery occurs between the terminal device and the first cell, the first information further includes at least one of a quantity of beam failures, a quantity of beam failure recovery times, or duration of the beam failure recovery.

Optionally, the first cell is a cell served by a first network device. When the first information includes the information indicating that the beam failure recovery occurs between the terminal device and the first cell, the processing unit 1220 is specifically configured to: adjust a configuration of the resource; or the transceiver unit 1210 is further configured to send second information to a second network device, where the second information is used to indicate the second network device to adjust a mobility parameter.

Optionally, the first cell is a cell served by the first network device. When the first information includes the information indicating that the radio link failure occurs between the terminal device and the first cell, the transceiver unit 1210 is specifically configured to: receive the first information sent by a second network device.

The processing unit 1220 is specifically configured to: adjust a configuration of the resource.

Alternatively, the transceiver unit 1210 is further configured to send second information to the second network device, where the second information is used to indicate the second network device to adjust a mobility parameter.

Optionally, the information about the beam includes an identifier of the beam and/or measurement information of the beam, and the identifier of the beam includes a synchronization signal block SSB group number and/or a channel state information reference signal CSI-RS group number;

and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

Optionally, the processing unit 1220 is specifically configured to perform any one or more of the following: adjust a first threshold corresponding to the SSB; adjust a second threshold corresponding to the CSI-RS; adjust a third threshold corresponding to the supplementary uplink carrier; or adjust a RACH resource, for example, a time-frequency resource corresponding to each SSB or CSI-RS, or a preamble group included in each SSB or CSI-RS, or properly adjust parameters such as an initial transmit/receive power and a step of a preamble.

Optionally, a protocol layer function of the apparatus is at least one of a radio link control protocol layer function, a media access control layer function, and a physical layer function; and/or a protocol layer function of the second network device is at least one of a radio resource control protocol layer function, a service data adaptation layer function, and a packet data convergence protocol layer function.

Optionally, the first cell is a cell served by the second network device. When the first information includes the information indicating that the beam failure recovery occurs between the terminal device and the first cell, the transceiver unit 1210 is specifically configured to: receive the first information sent by the second network device.

The processing unit 1220 is specifically configured to: adjust a mobility parameter.

Alternatively, the transceiver unit 1210 is further configured to send third information to the second network device, where the third information is used to indicate the second network device to adjust a configuration of the resource.

Optionally, the first cell is a cell served by the second network device. When the first information includes the information indicating that the radio link failure occurs between the terminal device and the first cell, the processing unit 1220 is specifically configured to: adjust a mobility parameter.

Alternatively, the transceiver unit 1210 is further configured to send third information to the second network device, where the third information is used to indicate the second network device to adjust a configuration of the resource.

Optionally, the transceiver unit 1210 is further configured to receive fourth indication information sent by the second network device, where the fourth indication information is used to indicate an adjusted configuration of the resource.

Optionally, a protocol layer function of the first network device is at least one of a radio resource control protocol layer function, a service data adaptation layer function, and a packet data convergence protocol layer function; and/or a protocol layer function of the second network device is at least one of a radio link control protocol layer function, a media access control layer function, and a physical layer function.

It should be understood that the information transmission apparatus 1200 may correspond to the network device in the foregoing method embodiments, and the information transmission apparatus 1200 may include units configured to perform the method performed by the network device in the information transmission method 200 to method 1100. In addition, the units in the information transmission apparatus 1200 and the foregoing other operations and/or functions are separately intended to implement corresponding procedures of the information transmission method 200 to method 1100. For a specific process of performing the foregoing corresponding steps by the units, refer to the foregoing description with reference to the method embodiments in FIG. 6 to FIG. 19. For brevity, details are not described herein again.

Figure 21:
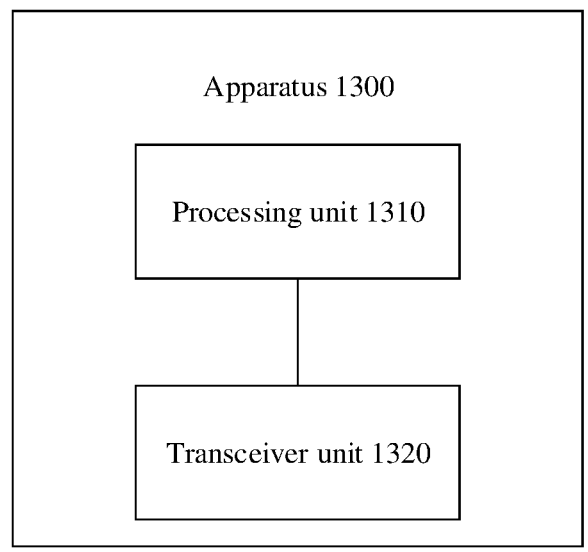
FIG. 21 is another schematic block diagram of an information transmission apparatus according to an embodiment of this application.

FIG. 21 is a schematic block diagram of an information transmission apparatus 1300 according to an embodiment of this application. As shown in FIG. 21, the information transmission apparatus 1300 may include a processing unit 1310 and a transceiver unit 1320.

In a possible design, the information transmission apparatus may be the terminal device in the method 300 to the method 1100, or a chip configured in the terminal device.

Specifically, the processing unit 1310 is configured to determine first information, where the first information includes information indicating that a radio link failure occurs between the terminal device and a first cell, or the first information includes information indicating that beam failure recovery occurs between the terminal device and the first cell.

The first information further includes information about a resource, and the information about the resource includes at least one of information about a beam, information about an uplink carrier, or information about a bandwidth part.

The transceiver unit 1320 is configured to send the first information.

Optionally, when the first information includes the information indicating that the beam failure recovery occurs between the terminal device and the first cell, the first information further includes at least one of a quantity of beam failures, a quantity of beam failure recovery times, or duration of the beam failure recovery.

Optionally, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

It should be understood that the information transmission apparatus 1300 may correspond to the terminal device in the information transmission method 200 to method 1100 according to the embodiments of this application, and the information transmission apparatus 1300 may include units configured to perform the method performed by the terminal device in the information transmission method 200 to method 1100. In addition, the units in the information transmission apparatus 1300 and the foregoing other operations and/or functions are separately intended to implement corresponding procedures of the information transmission method 200 to method 1100. For a specific process of performing the foregoing corresponding steps by the units, refer to the foregoing description with reference to the method embodiments in FIG. 6 to FIG. 19. For brevity, details are not described herein.

Figure 22:
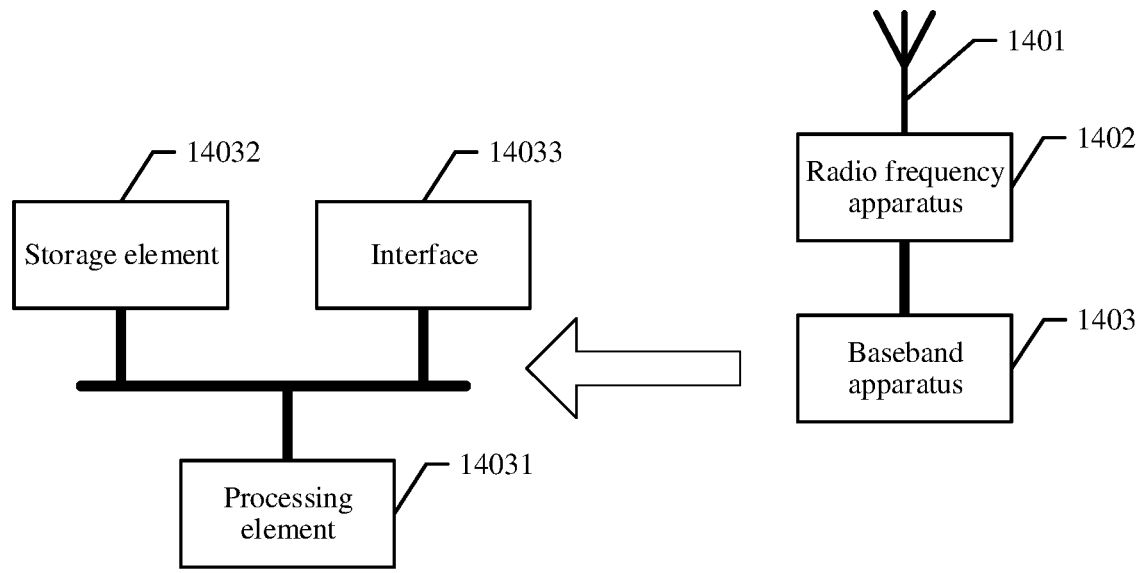
FIG. 22 is a schematic structural diagram of a network device according to an embodiment of this application.

FIG. 22 is a schematic structural diagram of a network device according to an embodiment of this application. The network device may be the network device (any one of the first network device to the sixth network device) in the foregoing embodiments, and is configured to implement operations of the network device (any one of the first network device to the sixth network device) in the foregoing embodiments. As shown in FIG. 22, the network device includes an antenna 1401, a radio frequency apparatus 1402, and a baseband apparatus 1403. The antenna 1401 is connected to the radio frequency apparatus 1402. In an uplink direction, the radio frequency apparatus 1402 receives, through the antenna 1401, information sent by a terminal device, and sends, to the baseband apparatus 1403 for processing, the information sent by the terminal device. In a downlink direction, the baseband apparatus 1403 processes information of the terminal device, and sends the information to the radio frequency apparatus 1402. The radio frequency apparatus 1402 processes the information of the terminal device, and then sends the processed information to the terminal device through the antenna 1401.

The baseband apparatus 1403 may include one or more processing elements 14031, for example, include one main control CPU and another integrated circuit. In addition, the baseband apparatus 1403 may further include a storage element 14032 and an interface 14033. The storage element 14032 is configured to store a program and data. The interface 14033 is configured to exchange information with the radio frequency apparatus 1402, and the interface is, for example, a common public radio interface (common public radio interface, CPRI). The foregoing apparatus used for the network device may be located in the baseband apparatus 1403. For example, the foregoing apparatus used for the network device may be a chip on the baseband apparatus 1403. The chip includes at least one processing element and interface circuit. The processing element is configured to perform the steps in any one of the methods performed by the network device. The interface circuit is configured to communicate with another apparatus. In an implementation, units of the network device that implement the steps in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units used by the network device to implement the steps in the foregoing methods may be configured as one or more processing elements. These processing elements are disposed on the baseband apparatus. The processing element herein may be an integrated circuit, for example, one or more application-specific integrated circuits (application-specific integrated circuit, ASIC), one or more digital signal processors (digital signal processor, DSP), one or more field programmable gate arrays (field programmable gate array, FPGA), or a combination of these types of integrated circuits. The integrated circuits may be integrated together to form a chip.

Units of the network device that implement the steps in the foregoing methods may be integrated together, and implemented in a form of an SOC. For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the processing element invoking a program, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these forms of integrated circuits.

A storage element may be one memory, or may be a general term of a plurality of storage elements.

Optionally, the network device shown in FIG. 22 may be the fifth network device or the sixth network device in the foregoing method embodiments.

Figure 23:
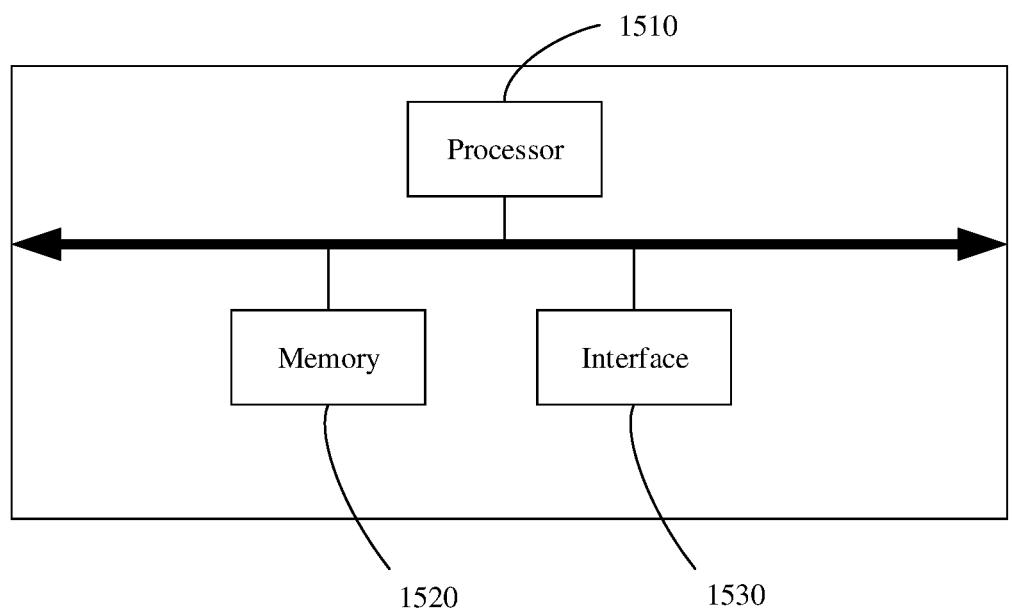
FIG. 23 is another schematic structural diagram of a network device according to an embodiment of this application.

FIG. 23 is another schematic structural diagram of a network device according to an embodiment of this application. The network device may be the network device in the foregoing embodiment, and is configured to implement an operation of the network device in the foregoing embodiments.

As shown in FIG. 23, the network device includes a processor 1510, a memory 1520, and an interface 1530. The processor 1510, the memory 1520, and the interface 1530 are signal-connected.

The foregoing information transmission apparatus 1200 may be located in the network device, and a function of each unit may be implemented by the processor 1510 by invoking a program stored in the memory 1520. That is, the foregoing information transmission apparatus 1200 includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

Optionally, the network device shown in FIG. 23 may be the first network device, the second network device, the third network device, or the fourth network device in the foregoing method embodiments.

Figure 24:
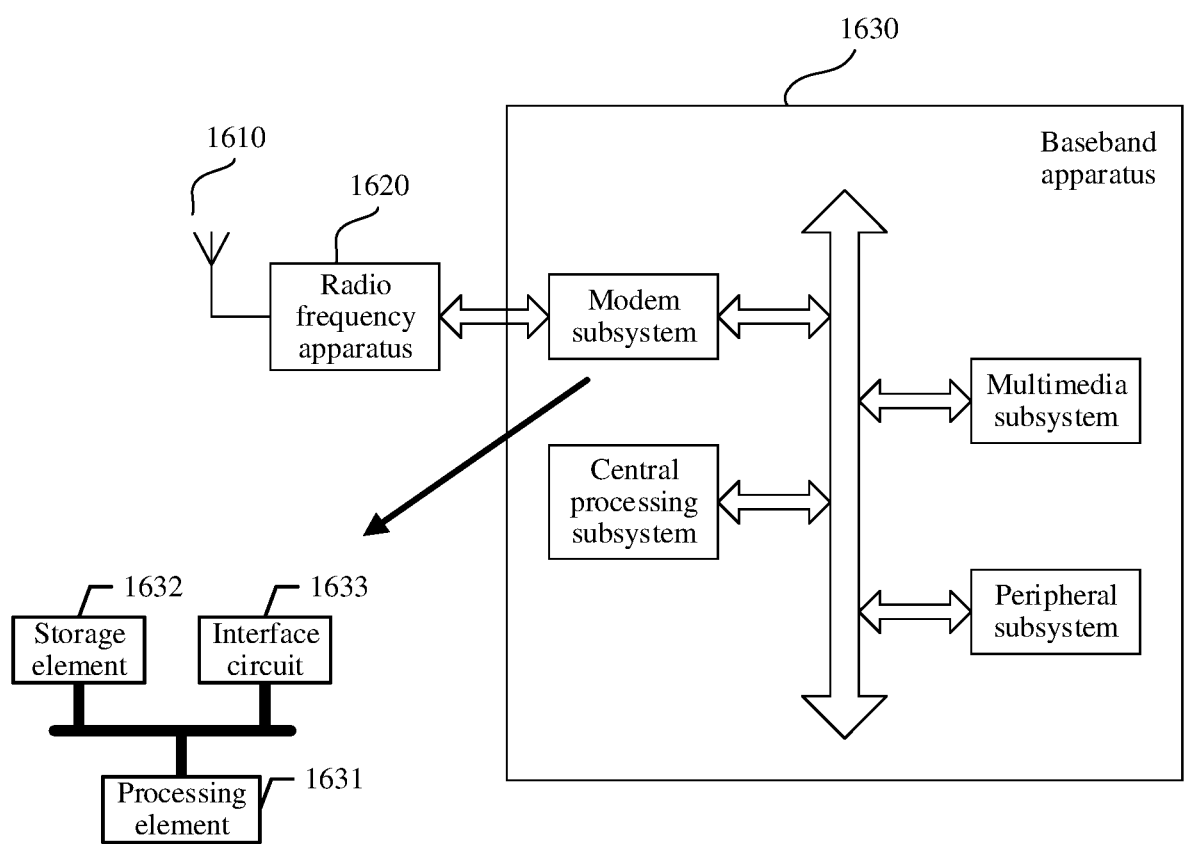
FIG. 24 is a schematic structural diagram of a terminal device according to an embodiment of this application.

FIG. 24 is a schematic structural diagram of a terminal device according to an embodiment of this application. The terminal device may be the terminal device in the foregoing embodiments, and is configured to implement an operation of the terminal device in the foregoing embodiments. As shown in FIG. 24, the terminal device includes an antenna 1610, a radio frequency part 1620, and a signal processing part 1630. The antenna 1610 is connected to the radio frequency part 1620. In a downlink direction, the radio frequency part 1620 receives, through the antenna 1610, information sent by a network device, and sends, to the signal processing part 1630 for processing, the information sent by the network device. In an uplink direction, the signal processing part 1630 processes information of the terminal device, and sends the information to the radio frequency part 1620. The radio frequency part 1620 processes the information of the terminal device, and then sends the processed information to the network device through the antenna 1610.

The signal processing part 1630 may include a modem subsystem, configured to process data at each communications protocol layer. The signal processing part 1630 may further include a central processing subsystem, configured to implement processing of an operating system and an application layer of the terminal device. In addition, the signal processing part 1630 may further include another subsystem, for example, a multimedia subsystem or a peripheral subsystem. The multimedia subsystem is configured to control a camera, a screen display, or the like of the terminal device, and the peripheral subsystem is configured to implement a connection to another device. The modem subsystem may be a separately disposed chip. Optionally, the foregoing apparatus used for the terminal device may be located in the modem subsystem.

The modem subsystem may include one or more processing elements 1631, for example, include one main control CPU and another integrated circuit. In addition, the modem subsystem may further include a storage element 1632 and an interface circuit 1633. The storage element 1632 is configured to store data and a program. However, a program used to perform the methods performed by the terminal device in the foregoing methods may not be stored in the storage element 1632, but is stored in a memory outside the modem subsystem, and is loaded and used by the modem subsystem when to be used. The interface circuit 1633 is configured to communicate with another subsystem. The foregoing apparatus used for the terminal device may be located in the modem subsystem, and the modem subsystem may be implemented by a chip. The chip includes at least one processing element and interface circuit. The processing element is configured to perform the steps in any one of the methods performed by the terminal device. The interface circuit is configured to communicate with another apparatus. In an implementation, units of the terminal device that implement the steps in the foregoing methods may be implemented by a processing element scheduling a program. For example, the apparatus used for the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, the program used to perform the methods performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal device that implement the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

It can be learned that the foregoing apparatus used for the terminal device may include at least one processing element and interface circuit. The at least one processing element is configured to perform any one of the methods performed by the terminal device that are provided in the foregoing method embodiments. The processing element may perform some or all steps performed by the terminal device, in a first manner, to be specific, by invoking the program stored in the storage element; or may perform some or all steps performed by the terminal device, in a second manner, to be specific, using a hardware integrated logic circuit in the processor element in combination with an instruction; or may perform, by combining the first manner and the second manner, some or all steps performed by the terminal device.

According to the methods provided in the embodiments of this application, this application further provides a computer program product. The computer program product includes computer program code. When the computer program code is run on a computer, the computer is enabled to perform the methods in the foregoing embodiments.

According to the methods provided in the embodiments of this application, this application further provides a computer-readable medium. The computer-readable medium stores program code. When the program code is run on a computer, the computer is enabled to perform the methods in the foregoing embodiments.

The terminal device and the network device in the foregoing apparatus embodiments may completely correspond to the terminal device or the network device in the method embodiments, and a corresponding module or unit performs a corresponding step. For example, when the apparatus is implemented by a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented in a chip manner, the sending unit is an interface circuit that is of the chip and that is configured to send a signal to another chip or apparatus.

An embodiment of this application further provides a communications system. The communications system includes the foregoing terminal device and/or the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a first network device, first information from a terminal device, wherein the first information comprises:
      information indicating that a radio link failure occurs between the terminal device and a first cell, or information indicating that beam failure recovery occurs between the terminal device and the first cell; and
      information about a resource, comprising information about an uplink carrier, wherein the information about the uplink carrier comprises an identifier of the uplink carrier or measurement information of the uplink carrier, the identifier of the uplink carrier comprises frequency information of the uplink carrier, and the uplink carrier comprises a normal uplink carrier or a supplementary uplink carrier; and
   performing, by the first network device, mobility robustness optimization based on the first information.

2. The method according to claim 1, wherein the first information comprises the information indicating that the beam failure recovery occurs between the terminal device and the first cell, and the first information further comprises any one or more of a quantity of beam failures, a quantity of beam failure recovery times, or a duration of the beam failure recovery.

3. The method according to claim 1, wherein the first cell is a cell served by the first network device, the first information comprises the information indicating that the beam failure recovery occurs between the terminal device and the first cell, and performing, by the first network device, mobility robustness optimization based on the first information comprises:
   adjusting, by the first network device, a configuration of the resource; or
   sending, by the first network device, second information to a second network device, wherein the second information indicates to the second network device to adjust a mobility parameter.

4. The method according to claim 3, wherein:
   a protocol layer function of the first network device is any one or more of a radio link control protocol layer function, a media access control layer function, or a physical layer function; or
   a protocol layer function of the second network device is any one or more of a radio resource control protocol layer function, a service data adaptation layer function, or a packet data convergence protocol layer function.

5. The method according to claim 1, wherein the information about the resource, further comprises information about a beam or information about a bandwidth part.

6. The method according to claim 5, wherein the information about the beam comprises an identifier of the beam or measurement information of the beam, and the identifier of the beam comprises a synchronization signal block (SSB) group number or a channel state information reference signal (CSI-RS) group number.

7. A method, comprising:
   sending, by a terminal device, first information, wherein the first information comprises:
      information indicating that a radio link failure occurs between the terminal device and a first cell, or information indicating that beam failure recovery occurs between the terminal device and the first cell; and
      information about a resource, comprising information about an uplink carrier, wherein the information about the uplink carrier comprises an identifier of the uplink carrier or measurement information of the uplink carrier, the identifier of the uplink carrier comprises frequency information of the uplink carrier, and the uplink carrier comprises a normal uplink carrier or a supplementary uplink carrier.

8. The method according to claim 7, wherein the first information comprises the information indicating that the beam failure recovery occurs between the terminal device and the first cell, and the first information further comprises any one or more of a quantity of beam failures, a quantity of beam failure recovery times, or a duration of the beam failure recovery.

9. The method according to claim 7, wherein the information about the resource, further comprises information about abeam or information about a bandwidth part.

10. The method according to claim 9, wherein the information about the beam comprises an identifier of the beam or measurement information of the beam, and the identifier of the beam comprises a synchronization signal block (SSB) group number or a channel state information reference signal (CSI-RS) group number.

11. An apparatus, applied to a first network device, comprising:
at least one processor, and a non-transitory memory storing instructions for execution by the at least one processor;
wherein, when executed, the instructions cause the apparatus to perform operations comprising:
receiving, first information from a terminal device, wherein the first information comprises:
information indicating that a radio link failure occurs between the terminal device and a first cell, or information indicating that beam failure recovery occurs between the terminal device and the first cell; and
information about a resource, comprising information about an uplink carrier, wherein the information about the uplink carrier comprises an identifier of the uplink carrier or measurement information of the uplink carrier, the identifier of the uplink carrier comprises frequency information of the uplink carrier, and the uplink carrier comprises a normal uplink carrier or a supplementary uplink carrier; and
performing mobility robustness optimization based on the first information.

12. The apparatus according to claim 11, wherein the first information comprises the information indicating that the beam failure recovery occurs between the terminal device and the first cell, and the first information further comprises any one or more of a quantity of beam failures, a quantity of beam failure recovery times, or a duration of the beam failure recovery.

13. The apparatus according to claim 11, wherein the first cell is served by the apparatus, the first information comprises the information indicating that the beam failure recovery occurs between the terminal device, and performing mobility robustness optimization based on the first information comprises:

adjusting a configuration of the resource; or
sending second information to a second network device, wherein the second information indicates the second network device to adjust a mobility parameter.

14. The apparatus according to claim 13, wherein:
a protocol layer function of the apparatus is any one or more of a radio link control protocol layer function, a media access control layer function, or a physical layer function; or
a protocol layer function of the second network device is any one or more of a radio resource control protocol layer function, a service data adaptation layer function, or a packet data convergence protocol layer function.

15. The apparatus according to claim 11, wherein the information about the resource, further comprises information about abeam or information about a bandwidth part.

16. The apparatus according to claim 15, wherein the information about the beam comprises an identifier of the beam or measurement information of the beam, and the identifier of the beam comprises a synchronization signal block (SSB) group number or a channel state information reference signal (CSI-RS) group number.

17. An apparatus, applied to a terminal device, comprising:
at least one processor, and a non-transitory memory storing instructions for execution by the at least one processor;
wherein, when executed, the instructions cause the apparatus to perform operations comprising:
sending first information, wherein the first information comprises:
information indicating that a radio link failure occurs between the apparatus and a first cell, or information indicating that beam failure recovery occurs between the apparatus and the first cell; and
information about a resource, comprising information about an uplink carrier, wherein the information about the uplink carrier comprises an identifier of the uplink carrier or measurement information of the uplink carrier, the identifier of the uplink carrier comprises frequency information of the uplink carrier, and the uplink carrier comprises a normal uplink carrier or a supplementary uplink carrier.

18. The apparatus according to claim 17, wherein the first information comprises the information indicating that the beam failure recovery occurs between the apparatus and the first cell, and the first information further comprises any one or more of a quantity of beam failures, a quantity of beam failure recovery times, or a duration of the beam failure recovery.

19. The apparatus according to claim 17, wherein the information about the resource, further comprises information about abeam or information about a bandwidth part.

20. The apparatus according to claim 19, wherein the information about the beam comprises an identifier of the beam or measurement information of the beam, and the identifier of the beam comprises a synchronization signal block (SSB) group number or a channel state information reference signal (CSI-RS) group number.

* * * * *

UNITED STATES PATENT AND TRADEMARK OFFICE
CERTIFICATE OF CORRECTION

PATENT NO. : 11,843,441 B2
APPLICATION NO. : 17/214034
DATED : December 12, 2023
INVENTOR(S) : Shi et al.

It is certified that error appears in the above-identified patent and that said Letters Patent is hereby corrected as shown below:

In the Claims

In Column 46, in Claim 5, Line 51, delete "abeam" and insert -- a beam --.

In Column 47, in Claim 9, Line 17, delete "abeam" and insert -- a beam --.

In Column 48, in Claim 15, Line 15, delete "abeam" and insert -- a beam --.

In Column 48, in Claim 19, Line 53, delete "abeam" and insert -- a beam --.

Signed and Sealed this
Twentieth Day of February, 2024

Katherine Kelly Vidal
*Director of the United States Patent and Trademark Office*